(12) United States Patent
Senarath et al.

(10) Patent No.: US 9,668,141 B2
(45) Date of Patent: May 30, 2017

(54) SYSTEMS AND METHODS FOR CLUSTERING OPTIMIZATION TO HELP RESOLVE BOUNDARY PROBLEMS IN COMMUNICATION SYSTEMS

(75) Inventors: Gamini Senarath, Ottawa (CA); Aaron Callard, Ottawa (CA); Mohammadhadi Baligh, Kanata (CA); Keyvan Zarifi, Ottawa (CA); Liqing Zhang, Nepean (CA); Ho Ting Cheng, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 677 days.

(21) Appl. No.: 13/547,920

(22) Filed: Jul. 12, 2012

(65) Prior Publication Data
US 2014/0019619 A1    Jan. 16, 2014

(51) Int. Cl.
| | |
|---|---|
| *H04W 40/24* | (2009.01) |
| *H04W 16/12* | (2009.01) |
| *H04W 40/32* | (2009.01) |
| *H04W 16/18* | (2009.01) |

(52) U.S. Cl.
CPC .......... *H04W 16/12* (2013.01); *H04W 40/24* (2013.01); *H04W 40/32* (2013.01); *H04W 16/18* (2013.01)

(58) Field of Classification Search
CPC .............................. H04W 40/24; H04W 40/32
USPC ........................................................ 455/446
See application file for complete search history.

(56) References Cited

U.S. PATENT DOCUMENTS

| | | | |
|---|---|---|---|
| 6,240,290 B1 * | 5/2001 | Willingham et al. ......... 455/436 |
| 6,493,759 B1 * | 12/2002 | Passman et al. .............. 709/227 |
| 7,355,998 B2 | 4/2008 | Briancon et al. | |
| 8,605,654 B2 * | 12/2013 | Beaudin ............. H04B 7/15542 370/310 |
| 2009/0080363 A1 | 3/2009 | Song et al. | |
| 2009/0312027 A1 * | 12/2009 | Foschini ............... H04W 24/02 455/446 |
| 2012/0110055 A1 * | 5/2012 | Van Biljon ............ G06Q 30/04 709/201 |
| 2012/0134267 A1 * | 5/2012 | Noriega ............ H04W 72/1236 370/230 |
| 2013/0142183 A1 * | 6/2013 | Lee ....................... H04W 24/02 370/338 |
| 2013/0286954 A1 * | 10/2013 | Ma ......................... H04B 7/024 370/329 |

FOREIGN PATENT DOCUMENTS

| | | |
|---|---|---|
| CN | 101051972 A | 10/2007 |
| CN | 101803278 A | 8/2010 |
| EP | 1 146 760 A2 | 10/2001 |
| WO | WO 98/35519 A3 | 8/1998 |

\* cited by examiner

*Primary Examiner* — Asghar Bilgrami
(74) *Attorney, Agent, or Firm* — Slater Matsil, LLP

(57) ABSTRACT

Various devices and methods are disclosed to support clustering optimization in a communication system. For example, multiple nodes of the communication system can be segmented into multiple clustering plans. Each clustering plan can include multiple clusters that do not overlap with one another within that clustering plan. At least one of the clusters of one clustering plan can overlap at least one of the clusters of at least one other clustering plan. Each node could be a non-boundary node in at least one cluster of at least one clustering plan. Multiple nodes of the communication system can alternatively be segmented into clusters having expanding and contracting borders.

34 Claims, 12 Drawing Sheets

SYSTEMS AND METHODS FOR CLUSTERING OPTIMIZATION TO HELP RESOLVE BOUNDARY PROBLEMS IN COMMUNICATION SYSTEMS

TECHNICAL FIELD

This disclosure relates generally to communication systems. More specifically, this disclosure relates to systems and methods for clustering optimization to help resolve boundary problems in communication systems.

BACKGROUND

Various approaches have been proposed for increasing the network capacity of communication networks. One example approach includes identifying one or more network-wide optimization solutions. Theoretically, significant gains could be obtained by performing these optimizations for an entire network. However, in large cellular or other networks, information sharing limitations and centralized processing limitations often prevent network-wide optimizations from being identified and implemented by a single centralized entity.

For these and other reasons, a network can instead be divided into smaller non-overlapping sections called clusters, and an optimization solution can be calculated for each cluster. Unfortunately, clusters are not always isolated from one another, and a node in one cluster can interfere with neighboring nodes in other clusters. This interference can cause local optimization solutions within the clusters to move away from a global optimization solution. As a result, the local optimization solutions typically do not approximate the global optimization solution. Because of this, the overall network has less network capacity using the local optimization solutions than would be obtainable using the global optimization solution.

SUMMARY

This disclosure provides systems and methods for clustering optimization to help resolve boundary problems in communication systems.

In a first embodiment, a method includes segmenting multiple nodes of a communication system into multiple clustering plans. Each clustering plan includes multiple clusters that do not overlap with one another within that clustering plan. At least one of the clusters of one clustering plan overlap at least one of the clusters of at least one other clustering plan. The method also includes assigning different portions of network resources to the different clustering plans.

In a second embodiment, a system includes multiple nodes configured to communicate wirelessly. The system also includes at least one controller configured to segment the nodes into multiple clustering plans. Each clustering plan includes multiple clusters that do not overlap with one another within that clustering plan. The clusters of one clustering plan overlap the clusters of at least one other clustering plan. The at least one controller is also configured to assign different portions of network resources to the different clustering plans.

In a third embodiment, an apparatus includes at least one memory configured to store information identifying multiple nodes in a communication system. The apparatus also includes at least one processing device configured to segment the nodes into multiple clustering plans. Each clustering plan includes multiple clusters that do not overlap with one another within that clustering plan. The clusters of one clustering plan overlap the clusters of at least one other clustering plan. The at least one processing device is also configured to assign different portions of network resources to the different clustering plans.

In a fourth embodiment, a non-transitory computer readable medium embodies a computer program. The computer program includes computer readable program code for performing the method of the first embodiment.

In a fifth embodiment, a method includes receiving an indication that a node in a communication system has been selected as a first duster controller for a first cluster of nodes in the communication system. The first cluster represents one of multiple non-overlapping clusters in a first clustering plan, and the first clustering plan represents one of multiple clustering plans. The method also includes performing optimization for network resources in the communication system assigned to the first clustering plan using the first cluster controller.

In a sixth embodiment, an apparatus in a communication system includes a receiver configured to receive an indication that the apparatus has been selected as a first cluster controller for a first cluster of nodes in the communication system. The first cluster represents one of multiple non-overlapping clusters in a first clustering plan, and the first clustering plan represents one of multiple clustering plans. The apparatus also includes at least one processing device configured to perform optimization for network resources in the communication system assigned to the first clustering plan using the first cluster controller.

In a seventh embodiment, a non-transitory computer readable medium embodies a computer program. The computer program includes computer readable program code for performing the method of the fifth embodiment.

In an eighth embodiment, a method includes receiving multiple messages at a specified node in a communication system. The messages identify operating parameters to be used by different portions of network resources in the communication system. The method also includes operating the specified node using the operating parameters for the network resources. The messages are received from different cluster controllers associated with different clusters of nodes in the communication system. The different clusters are associated with different clustering plans. The different portions of the network resources are assigned to the different clustering plans.

In a ninth embodiment, an apparatus in a communication system includes a receiver configured to receive multiple messages. The messages identify operating parameters to be used by different portions of network resources in the communication system. The apparatus also includes at least one processing device configured to operate the apparatus using the operating parameters for the network resources. The receiver is configured to receive the messages from different cluster controllers associated with different clusters of nodes in the communication system, where the different clusters are associated with different clustering plans and the different portions of the network resources are assigned to the different clustering plans.

In a tenth embodiment, a non-transitory computer readable medium embodies a computer program. The computer program includes computer readable program code for performing the method of the eighth embodiment.

In an eleventh embodiment, a method includes segmenting multiple nodes of a communication system into multiple clusters to form first cluster instances. The first cluster instances have associated cluster controllers. The method also includes modifying boundaries of the clusters to form second cluster instances. A boundary node in at least one cluster instance is a non-boundary node in at least one other cluster instance. The method further includes assigning different portions of network resources to the different cluster instances. The cluster controllers are configured to optimize the different portions of the network resources for the different cluster instances.

In a twelfth embodiment, a system includes multiple nodes configured to communicate wirelessly. The system also includes at least one controller configured to segment the nodes into multiple clusters to form first cluster instances and to assign cluster controllers to the first cluster instances. The at least one controller is also configured to modify boundaries of the clusters to form second cluster instances, where a boundary node in at least one cluster instance is a non-boundary node in at least one other cluster instance. The at least one controller is further configured to assign different portions of network resources to the different cluster instances, where the cluster controllers are configured to optimize the different portions of the network resources for the different cluster instances.

In a thirteen embodiment, an apparatus includes at least one memory configured to store information identifying multiple nodes in a communication system. The apparatus also includes at least one processing device configured to segment the nodes into multiple clusters to form first cluster instances and to assign cluster controllers to the first cluster instances. The at least one processing device is also configured to modify boundaries of the clusters to form second cluster instances, where a boundary node in at least one cluster instance is a non-boundary node in at least one other cluster instance. The at least one processing device is further configured to assign different portions of network resources to the different cluster instances, where the cluster controllers are configured to optimize the different portions of the network resources for the different cluster instances.

In a fourteenth embodiment, a non-transitory computer readable medium embodies a computer program. The computer program includes computer readable program code for performing the method of the tenth embodiment.

The optimization within a cluster done by a cluster controller could be for different types of objectives in accordance with different types of technologies. This could include, for example, joint power and scheduling optimization, load balancing, joint transmission and processing schemes, coordinated beam forming, multicasting and broadcasting, special content delivery mechanisms, and joint coding schemes. Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 17, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
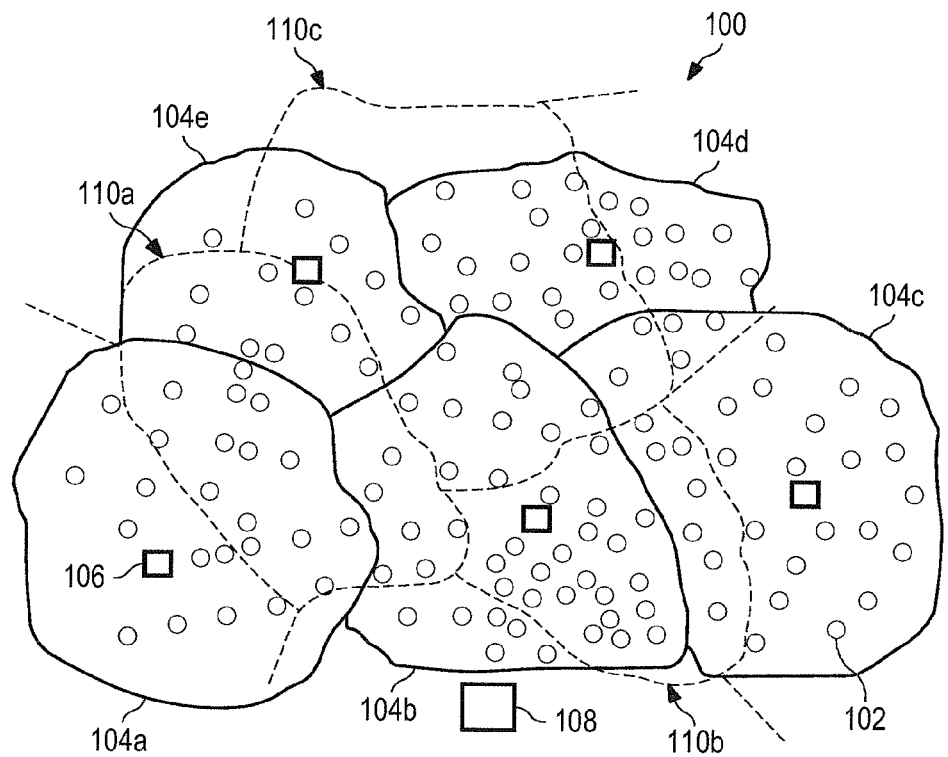
FIG. 1 illustrates an example communication system supporting clustering optimization using multiple overlapping clustering plans according to this disclosure.

FIG. 1 illustrates an example communication system 100 supporting clustering optimization using multiple overlapping clustering plans according to this disclosure. As shown in FIG. 1, the communication system 100 includes a number of nodes 102. Each node 102 represents any suitable device or system that communicates with at least one other node 102 in the system 100. The type(s) of nodes 102 in the communication system 100 can vary depending on the type of communication system being used.

In a wireless communication system 100, the nodes 102 could include base stations and end user devices. A base station generally denotes equipment used to communicate wirelessly with and provide wireless service to multiple end user devices in a specified area. A base station often includes multiple transceivers mounted on a tower or other structure(s). Different types of base stations may or may not be used in a wireless communication system 100. For instance, different base stations may have different transmit power capabilities. As a specific example, some base stations may be classified as full transmit power base stations and can be referred to as "macro" base stations. Other base stations may be classified as low transmit power base stations, such as "pico" or "femto" base stations.

An end user device generally denotes a device used by an end user who receives one or more communication services from the communication system 100. For example, an end user device could transmit data to and/or receive data from one or more of the base stations in the system 100. An end user device can represent any suitable device, such as a mobile telephone or smartphone, portable computer, or other device.

In particular implementations of a wireless communication system 100, the system 100 could represent a Third Generation Partnership Project (3GPP) Long Term Evolution (LTE) compliant communication system. However, other types of wireless communication systems could be used, such as an IEEE 802.16, WiMAX, or other standards-compliant or non-standards-compliant wireless communication system.

In a wired communication system 100, the nodes 102 could represent other types of devices. For example, the nodes 102 could include switches, routers, concentrators, and other devices that route data traffic over wired communication links. Also, the nodes 102 could include end user devices, such as desktop, laptop, or server computers or wired telephones.

In general, each node 102 in the communication system 100 includes any suitable structure(s) for communicating information to or receiving information from at least one other node in the system 100. A node 102 may also be connected to or communicate with one or more user terminals. The example types of communication systems 100 described above are non-limiting, and any other suitable type(s) of communication system(s) could be used. Note that a combination of wired and wireless nodes 102 could be used in the same communication system.

As shown in FIG. 1, the nodes 102 can be partitioned into multiple non-overlapping clusters 104a-104e, shown in this example with solid-line borders. "Non-overlapping" in this context indicates that the nodes in any cluster 104a-104e are included only in that cluster 104a-104e at any given time (of course, radio signals may extend past cluster boundaries). These non-overlapping clusters form at least part of one clustering plan, which represents a collection of non-overlapping clusters. Each of the clusters 104a-104e in FIG. 1 is associated with a cluster controller 106. Each cluster controller 106 determines one or more operating parameter settings for the base stations or other nodes 102 within its associated cluster. For example, a cluster controller 106 could identify an optimization solution for downlink power control and scheduling, joint processing, and load balancing within its associated cluster. Also, the cluster controller 106 in one cluster may interact with and coordinate its operations with the cluster controller(s) 106 in one or more other clusters and/or with at least one central controller 108. As a specific example, the cluster controller 106 in one cluster can share its optimization solution or other operating parameter setting(s) with cluster controllers 106 in neighboring clusters and/or with the central controller 108.

Each cluster controller 106 includes any suitable structure for performing one or more optimization operations for an associated cluster or clusters of nodes in a communication system. A cluster controller 106 could form part of a node 102, such as when the cluster controller 106 is implemented in a base station or other device. The cluster controller 106 could also represent a stand-alone device that communicates with base stations or other nodes using wired or wireless communications.

Each central controller 108 includes any suitable structure for performing one or more centralized operations for a communication system. A central controller 108 could, for example, help to partition the system 100 into clusters, coordinate the operation of the cluster controllers 106, coordinate the sharing of operating parameter settings amongst the cluster controllers 106, and control when the cluster controllers 106 determine the operating parameter settings. The central controller 108 could form part of a node 102, such as when the central controller 108 is implemented in a base station or other device. The central controller 108 could also represent a stand-alone device that communicates with base stations or other nodes using wired or wireless communications.

Note that the use of the cluster controllers 106 and/or the central controllers 108 is optional. For example, cluster controllers 106 could be linked together over one or more high-speed data links or other communication paths and could communicate relevant data to one another without the use of a central controller 108. As another example, a group of base stations or other nodes 102 could be responsible for determining their own operating parameter settings without the use of a cluster controller.

If the system 100 merely includes one clustering plan with the non-overlapping clusters 104a-104e, the system 100 could suffer from various problems. For example, interference between clusters 104a-104e could occur, particularly at the nodes 102 located near the boundary of two clusters. A "boundary node" refers to a node located at or near the boundary between two clusters. More specifically, a boundary node under a given clustering plan can be defined as a node at or near the boundary of a cluster that serves at least one end user terminal, which causes excessive interference to or receives excessive interference from another terminal associated with a node belonging to another cluster under the same clustering plan. Because of this interference, optimizations within the clusters 104a-104e may not be near or may move away from a global optimal, and the boundary nodes 102 can exhibit poor performance under an optimization done only for that clustering plan.

In accordance with this disclosure, multiple clustering plans can be used to address the boundary problem experienced by systems that use fixed clustering. Each clustering plan includes a set of non-overlapping clusters. However, the clusters in different clustering plans do overlap. In particular, the clustering plans are defined so that boundary nodes in one clustering plan are centered or nearly centered in another clustering plan. In the example shown in FIG. 1, a second clustering plan includes clusters 110a-110c, shown in this example with dashed-line borders. These clusters 110a-110c are non-overlapping with respect to each other, but the clusters 110a-110c do overlap with the clusters 104a-104e of the other clustering plan. In other embodiments, various changes may be made. For example, at least one but not all of the clusters 110a-110c in one clustering plan overlaps with at least one but not all of the clusters 104a-104e of the other clustering plan. Although not shown, each of the clusters 110a-110c can have its own cluster controller that performs optimization operations for that cluster.

In this approach, a node 102 along the boundary between clusters in one clustering plan is located more centrally in a cluster of another clustering plan. Each node 102 therefore belongs to different clusters in different clustering plans. When a node 102 belongs to different clusters in different clustering plans, different portions of the bandwidth or other network resources associated with that node 102 can be controlled by those different clusters, or the same network resources associated with that node 102 can be controlled by those different clusters at different times. This way, at least part of the network resources can be optimized to address a boundary problem elsewhere in the system 100, and at least part of the network resources can be optimized to address its own interference issues with its neighbors. This approach allows each cluster to operate using dynamic cluster-based optimization algorithms. However, different clustering plans take control of and optimize a suitable part of the total resources in the system 100. Depending on the implementation, this could provide close to globally-optimized performance in the system 100.

Note that while a node 102 in FIG. 1 belongs to two clusters in two clustering plans, each node 102 could belong to any number of clusters in any number of clustering plans. Also note that the resources being controlled by multiple clusters could represent any suitable processing, communication, or other resources in the system 100. Further, the resources can be controlled by different clusters in any suitable manner, such as when different clusters control the same resources in different time slots or when different clusters control different frequencies used for communications. In addition, note that the one-to-one relationship between clusters and cluster controllers in FIG. 1 is for illustration only. In other embodiments, one cluster controller could perform operations for multiple clusters. For instance, two adjacent clusters in different clustering plans may have only one cluster controller, which performs optimizations for each cluster separately.

Additional details regarding the use of multiple clustering plans in a communication system are provided below. Again, as noted above, this functionality could be used with any suitable wired or wireless communication system.

Although FIG. 1 illustrates one example of a communication system 100 supporting clustering optimization using multiple overlapping clustering plans, various changes may be made to FIG. 1. For example, a communication system 100 could include any number of nodes 102 in any suitable configuration. Also, the communication system 100 could include any number of clustering plans to provide adequate coverage of the nodes 102.

Figure 2:
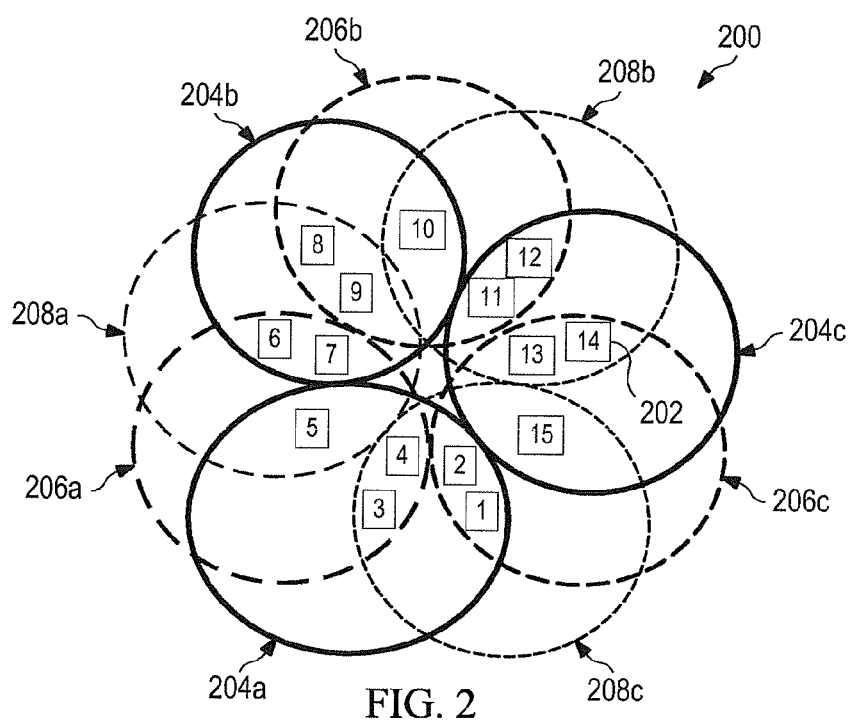
FIG. 2 illustrates a more detailed example clustering of nodes with multiple overlapping clustering plans in a communication system according to this disclosure.

FIG. 2 illustrates a more detailed example clustering of nodes with multiple overlapping clustering plans in a communication system 200 according to this disclosure. As shown in FIG. 2, the communication system 200 includes fifteen nodes 202, which are numbered 1 through 15.

There are also three different clustering plans, each containing non-overlapping clusters. A first clustering plan includes clusters 204a-204c, shown in this example with solid-line borders. Cluster 204a includes nodes 1 through 5, cluster 204b includes nodes 6 through 10, and cluster 204c includes nodes 11 through 15. A second clustering plan includes clusters 206a-206c, shown in this example with large-dashed-line borders. Cluster 206a includes nodes 3 through 7, cluster 206b includes nodes 8 through 12, and cluster 206c includes nodes 13 through 15, 1, and 2. A third clustering plan includes clusters 208a-208c, shown in this example with small-dashed-line borders. Cluster 208a includes nodes 5 through 9, cluster 208b includes nodes 10 through 14, and cluster 208c includes nodes 15 and 1 through 4.

As can be seen in FIG. 2, each of the nodes 202 is located near the center of a cluster in at least one clustering plan and near the boundary of a cluster in at least one other clustering plan. As a result, each node 202 appears as a boundary node in at least one clustering plan. However, each node 202 can also appear as a non-boundary node in at least one other clustering plan. As a result, the system 200 can manage boundary problems better than conventional systems where a boundary node does not appear as a non-boundary node in any cluster.

Although FIG. 2 illustrates a more detailed example of the clustering of nodes with multiple overlapping clustering plans in a communication system 200, various changes may be made to FIG. 2. For example, the communication system 200 could include any number of nodes 202 in any suitable configuration and any number of clusters and clustering plans.

Figure 3:
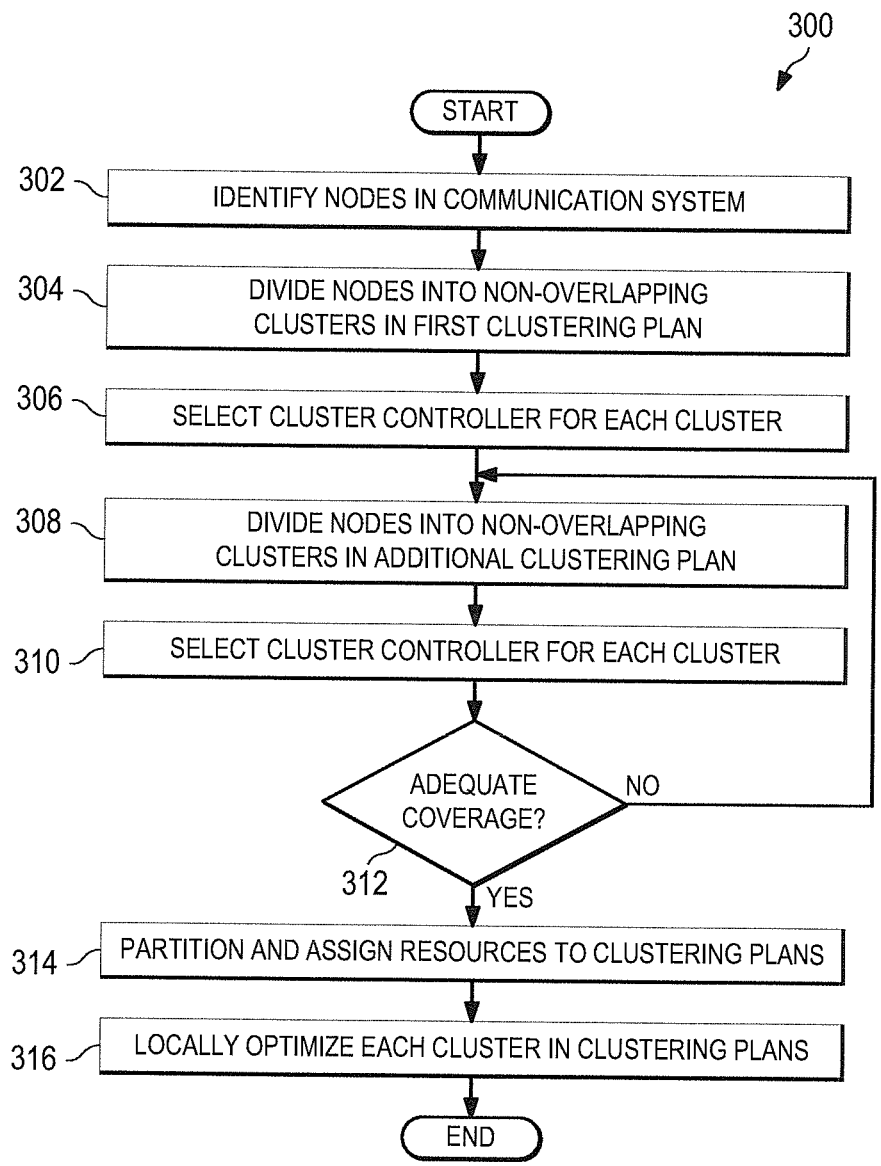
FIG. 3 illustrates an example method for clustering nodes in a communication system using multiple overlapping clustering plans according to this disclosure.

FIG. 3 illustrates an example method 300 for clustering nodes in a communication system using multiple overlapping clustering plans according to this disclosure. As shown in FIG. 3, nodes in a communication system are identified at step 302. This could include, for example, a central controller 108 identifying the nodes 102 or 202 in the system 100 or 200. As a particular example, this could include the central controller 108 identifying different base stations or other devices that are present within a wireless system.

The nodes are divided into non-overlapping clusters in a first clustering plan at step 304. This could include, for example, the central controller 108 performing any suitable segmentation algorithm to divide the nodes 102 or 202 into non-overlapping clusters. As a particular example, the nodes can be segmented into clusters in such a way that a locally-optimal solution could be obtained in each of the clusters. A cluster controller for each cluster in the first clustering plan is selected at step 306. This could include, for example, the central controller selecting a base station or other node 102 or 202 located in a central area of each cluster to act as the cluster controller for that cluster. Each cluster controller can be selected to perform optimization operations for the nodes in that cluster.

The nodes are divided into non-overlapping clusters in a second clustering plan at step 308. This could include, for example, the central controller 108 performing any suitable segmentation algorithm to again divide the nodes 102 or 202 into non-overlapping clusters. This segmentation can again segment the nodes 102 or 202 into clusters in such a way that a locally-optimal solution could be obtained in each of the clusters. However, at least some of the boundary nodes from the first clustering plan are non-boundary nodes within the second clustering plan. A cluster controller for each cluster in the second clustering plan is selected at step 310. This could include, for example, the central controller 108 selecting a base station or other node 102 or 202 located in a central area of each cluster to act as the cluster controller for that cluster. Again, each cluster controller can be selected to perform optimization operations for the nodes in that cluster.

A determination is made whether the clustering plans provide adequate coverage of the nodes in the communication system at step 312. This could include, for example, the central controller 108 determining whether each node 102 or 202 is located at or near the center of a cluster in at least one of the clustering plans. This could be done in any suitable manner, such as by using knowledge of the actual locations of the nodes or based on mutual interference among the nodes (since high mutual interference indicates that a node is a boundary node).

If at least one of the nodes is a boundary node in all current clustering plans, the process returns to step 308 to generate an additional clustering plan. Any suitable number of clustering plans could be generated during the method 300.

If each node is a non-boundary node in at least one of the clustering plans, network resources are partitioned and assigned to the different clustering plans at step 314. This could include, for example, the central or cluster controllers assigning resources based on the number of end user devices in each cluster. As a particular example, resources can be assigned to a clustering plan based on the loading of end user devices exclusively served by that clustering plan, where the loading is defined by the number of non-boundary end user devices in the clustering plan that are boundary end user devices under other clustering plans. It is also possible that a percentage of resources are common to all clustering plans. This is possible, for example, when there are only a few boundary users. In that case, only a small amount of resources may be needed for their use, and the clusters may not take the boundary users into consideration when performing common resource optimizations.

At this point, resources have been assigned, and each cluster in the clustering plans can be locally optimized at step 316. This could include, for example, the cluster controller in each cluster performing downlink power control and scheduling, joint processing, and load balancing optimization calculations. The cluster controllers can exchange data with each other to facilitate the optimizations. The optimizations of the clusters can be done sequentially or in parallel. During the optimizations of the clusters in each clustering plan, the resources assigned to other clustering plans can remain unchanged. Example techniques for performing local optimization are disclosed in U.S. patent application Ser. No. 13/366,188, filed on Feb. 3, 2012, and entitled "System and Method for Selecting Operating Parameters in a Communications System," which is hereby incorporated by reference.

Note that the segmentation of nodes into clusters can be based on any suitable criteria. For example, in some embodiments, nodes are segmented into clusters based on the geographical locations of the nodes and each node's wireless coverage area. One possible implementation is that each cluster in a clustering plan has an equal number (x) of nodes, where the number is a configurable design parameter. Starting from one point of the network, x neighboring nodes can be selected and marked as a cluster. This can be repeated for the next x number of neighbors, which form another cluster. This process can be repeated until all nodes are divided into clusters (note that some clusters may have fewer than x nodes due to geometry). Once the nodes are segmented into clusters of a first clustering plan, boundary nodes in the first clustering plan are identified, and clusters of a second clustering plan are identified in a similar manner. Ideally, the maximum number of boundary nodes from the first clustering plan are included at or near the centers of the clusters in the second clustering plan. Additional clustering plans can be created until each node resides within a cluster in which it is not a boundary node.

The segmentation of nodes into clusters could also be done to create a more uniform distribution of non-boundary nodes under each clustering plan. The segmentation could further be performed based on the availability of physical connections between nodes. For instance, when nodes are connected to each other using high speed links (such as optical fibers), those nodes could be clustered together in at least one clustering plan. Similarly, traffic loading may be used to change a previous segmentation.

In addition, the segmentation could be based on the mutual interference each node causes to other nodes. Mutual interference is the total average interference one node causes to other nodes. Mutual interference can be evaluated using signal strength measurements or the interference measured once a system is in operation. In the latter case, the measurements could be done to refine a previous default or other segmentation. When mutual interference is used, one technique is to group nodes so that each cluster contains the highest sum of the total mutual interference caused by its nodes to each other within the cluster and the lowest interference to neighboring clusters. In a second clustering plan, the mutual interference among cell center nodes of the previous clustering plan is set to zero, and the clustering is repeated to achieve the same goal (so that each cluster contains the highest sum of the total mutual interference caused by its nodes to each other within the cluster and the lowest interference to neighboring clusters). This process can be repeated until the mutual interference values between each node is zero.

As can be seen here, there are numerous techniques that could be used to segment nodes into clusters of one or more clustering plans. Any individual one of these techniques or any combination of techniques could be used to segment the nodes during the method 300.

Although FIG. 3 illustrates one example of a method 300 for clustering nodes in a communication system, various changes may be made to FIG. 3. For example, while shown as a series of steps, various steps in FIG. 3 could overlap, occur in parallel, or occur multiple times. Also, note that each step in FIG. 3 could be performed by any suitable device(s) and is not limited to those devices described above.

Figure 4:
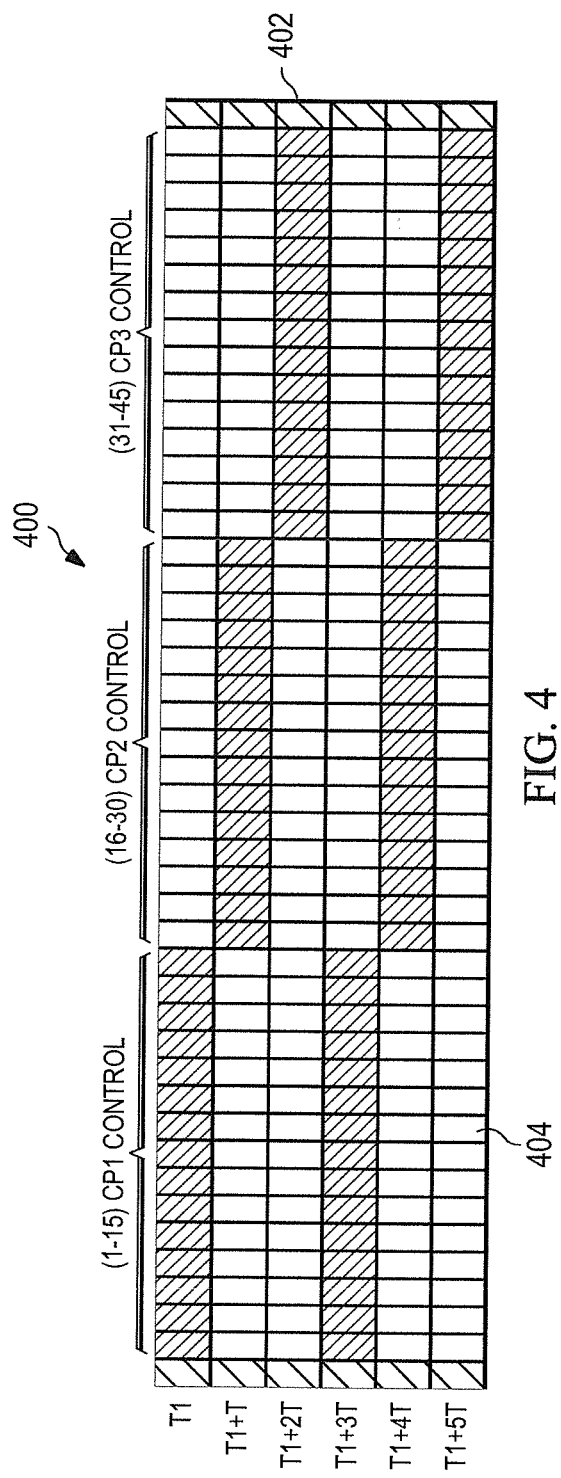
FIGS. 4 through 7 illustrate example sequential and parallel optimization operations in different clustering plans according to this disclosure.
Figure 5:
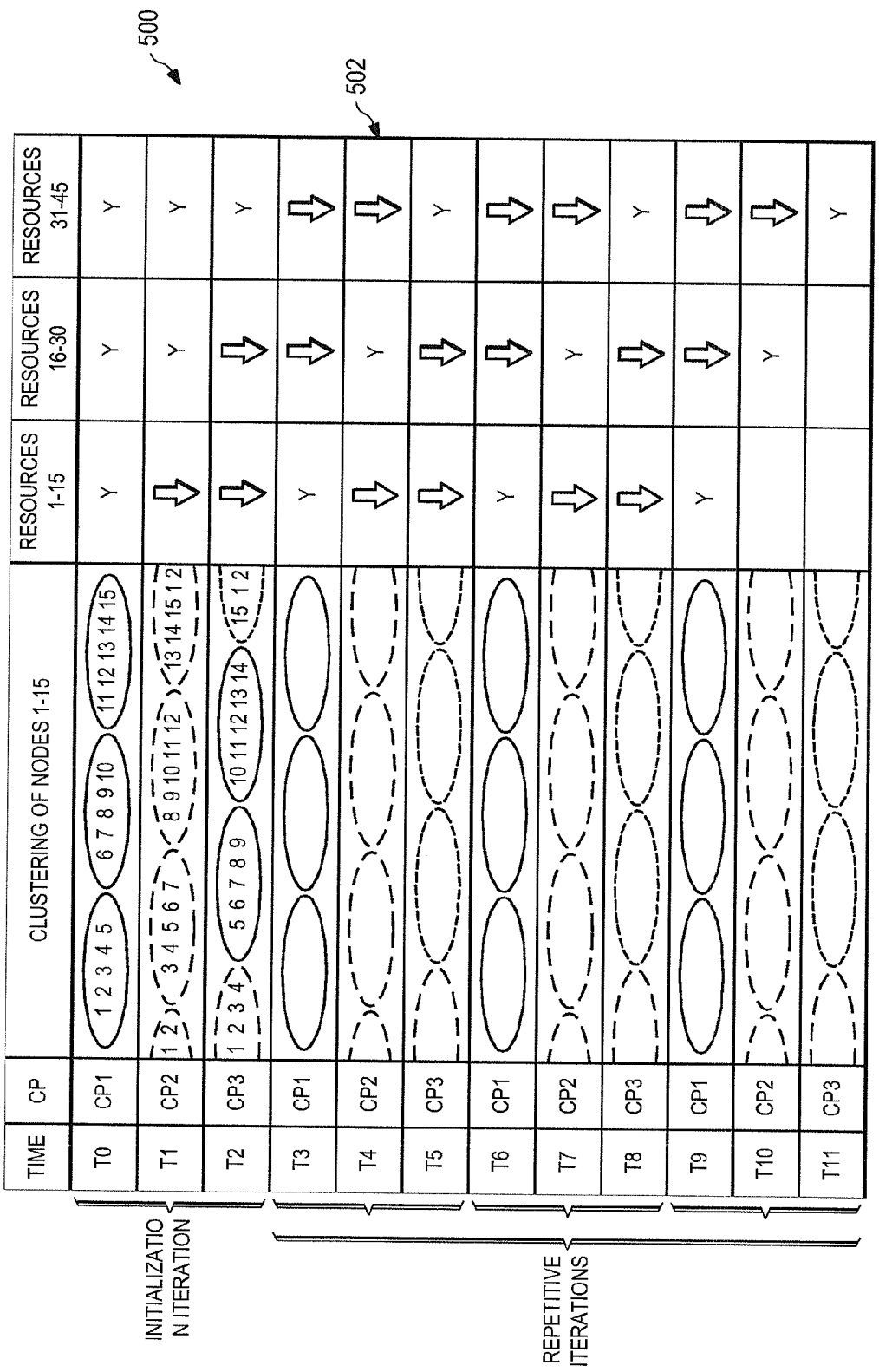

FIGS. 4 through 7 illustrate example sequential and parallel optimization operations in different clustering plans according to this disclosure. FIGS. 4 and 5 illustrate example sequential optimizations 400 and 500 in different clustering plans. The optimizations are said to be sequential since a communication system implements only one clustering plan's optimization at a given time. Here, it is assumed that the sequential optimizations are occurring within FIG. 2 where there are three clustering plans (CP1-CP3) and each clustering plan has control of 15 resource blocks (RBs) out of 45 total available resource blocks. Resource blocks 1 through 15 in FIG. 4 denote the resource blocks assigned to clustering plan CP1. Resource blocks 16 through 30 in FIG. 4 denote the resource blocks assigned to clustering plan CP2. Resource blocks 31 through 45 in FIG. 4 denote the resource blocks assigned to clustering plan CP3.

Rows 402 in FIG. 4 represent different periods of time. The first row 402 is associated with time T1. Subsequent rows 402 are associated with times T1+xT, where T denotes the length of one or more transmission time intervals (TTIs). Each row 402 is divided into multiple segments 404.

In this example, the hatched segments 404 represent times when optimizations occur for the resources of the clustering plans. As can be seen here, the optimizations are sequential in that the optimization for one clustering plan does not overlap with the optimization for the other clustering plans. Optimization occurs for the resources in the clustering plan CP1 but not for the resources in the other clustering plans CP2 and CP3 during one time period. Optimization then occurs for the resources controlled by the clustering plan CP2 but not for the resources controlled by the other clustering plans CP1 and CP3 during the next time period. Optimization then occurs for the resources controlled by the clustering plan CP3 but not for the resources controlled by the other clustering plans CP1 and CP2 during the next time period. The process then repeats.

In FIG. 5, downlink power control is optimized sequentially for the nodes in the clustering plans CP1-CP3. Each row 502 in FIG. 5 denotes a time period when downlink power in one of the clustering plans is optimized. A "Y" value in a row 502 indicates that downlink power is optimized for resources during the time period associated with that row 502. A down arrow in a row 502 indicates that downlink power optimization can be calculated ahead of time using off-line evaluations or other calculations, but the results may not be implemented during that time period's optimization.

As shown in FIG. 5, the first three rows 502 represent an initial set of optimizations. In the first row 502, during a first time slot T0, the system is initialized with clustering plan CP1's optimization, and the power for all resources is updated. In the second row 502, during the next time slot T1, clustering plan CP2's optimization is implemented, but the previous power levels assigned by clustering plan CP1 for resources 1 through 15 for this time slot remain unchanged. Note that in time slot T0, clustering plan CP1 can evaluate the power levels of resources 1 through 15 for time slots T1 and T2 ahead of time and inform the other clustering plans CP2 and CP3. Similarly, in time slot T1, clustering plan CP2 can evaluate the power levels for resources 16 through 30 for time slots T2 and T3 ahead of time and inform the other clustering plans CP1 and CP3. In the third row 502, during the third time slot T2, clustering plan CP3's optimization is implemented, but the previous power levels assigned to resources 1 through 30 for this time slot in clustering plans CP1-CP2 remain unchanged.

Once the initialization time periods are completed, the system performs repetitive sets of optimizations. Optimization is implemented for the resources in only one clustering plan in each row 502 starting with the fourth row 502, and optimization for each clustering plan occurs once during each repetitive set. That is, only resources 1 through 15 are updated during the time periods for the CP1 rows 502, only resources 16 through 30 are updated during the time periods for the CP2 rows 502, and only resources 31 through 45 are updated during the time periods for the CP3 rows 502. Other resources use the pre-assigned power levels or the same power levels as in their previous slot, depending on what scheme is implemented.

Figure 6:
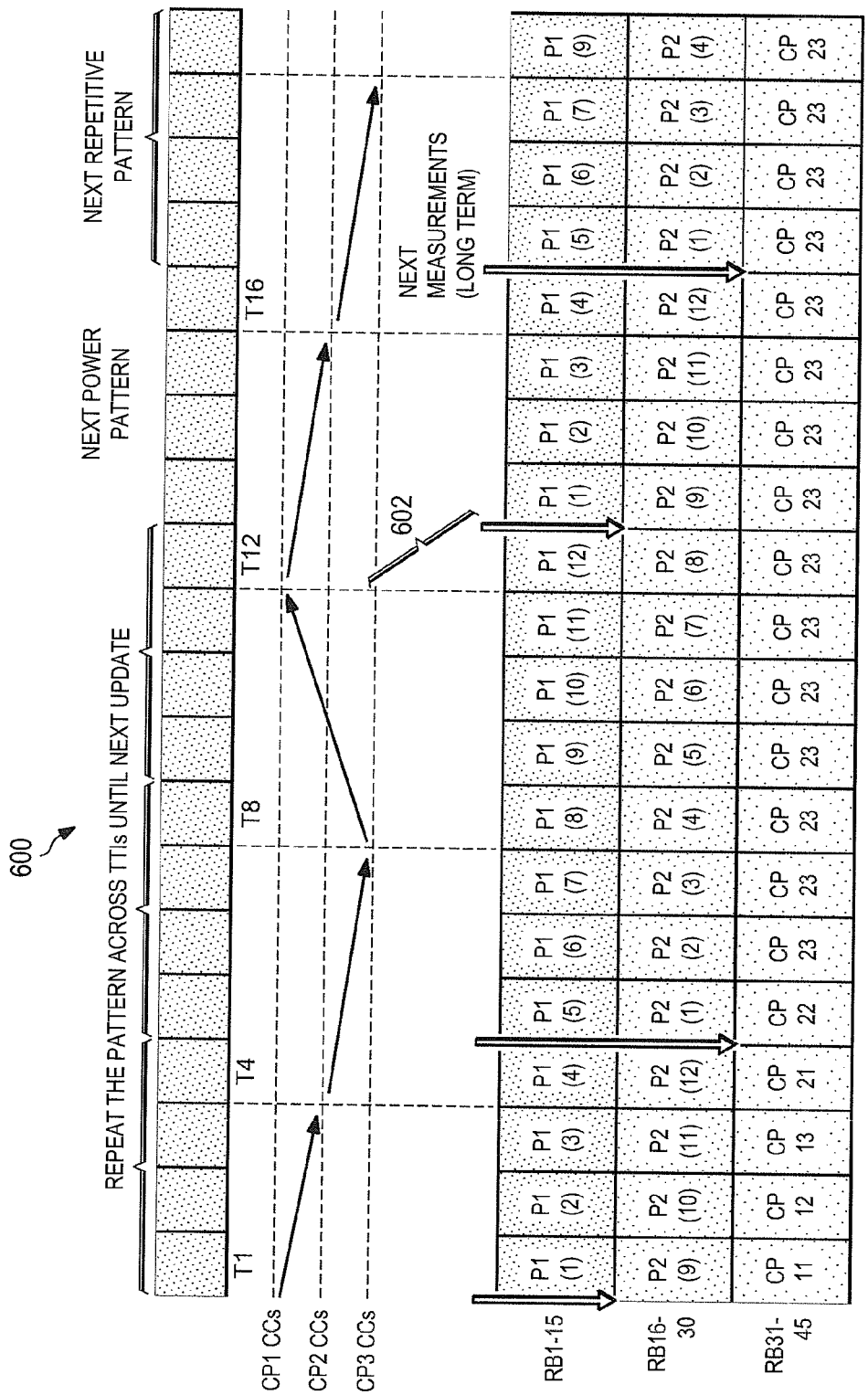

Note that during sequential optimizations of downlink power or other characteristic(s) for multiple clustering plans, there can be some delay associated with cluster-to-cluster or other messaging. For example, in a wireless communication system, there can be delay associated with wireless messaging transmission preparation, propagation, and reception handling. As a result, optimizations can be calculated and then implemented later after some time period has elapsed. An example of this is shown in FIG. 6, where sequential optimizations 600 occur involving multiple cluster controllers (CCs) in clustering plans CP1-CP3. As shown in FIG. 6, there is a one TTI delay 602 between the receipt of information from another cluster controller and the implementation of a downlink power optimization solution. This delay provides time for message propagation to occur in the system.

In FIG. 6, at time slot T1, clustering plan CP1 evaluates a set of power levels for its resources for the next twelve time slots (assuming a delay of four time slots for propagation delay and processing). Then, at time T1+12 T, clustering plan CP1 again evaluates the power levels of its resources for the next twelve time slots (where T equals one time slot). Similarly, clustering plan CP2 performs its optimization at time slot T1+4 T for its next twelve time slots, clustering plan CP3 performs its optimization at time slot T1+8 T for its next twelve time slots, and each repeats this process.

Figure 7:
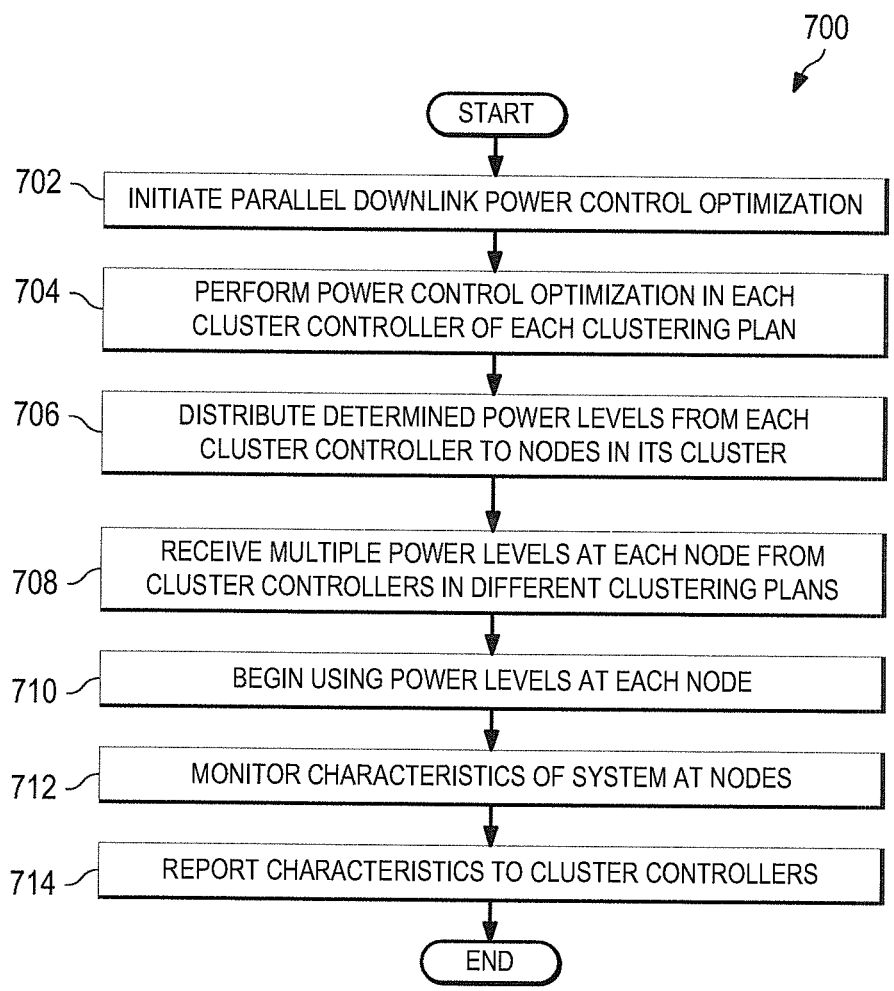

FIG. 7 illustrates an example method 700 for parallel optimizations in different clustering plans. As shown in FIG. 7, the parallel optimization of downlink power control is initiated at step 702. Power control optimization is performed at each cluster controller in each clustering plan at step 704. This could include, for example, each cluster controller identifying the optimal downlink power to be used by the nodes in its cluster. The determined power levels are distributed from each cluster controller to the nodes in its cluster at step 706. This could be done in any suitable manner, such as by using wired or wireless communications.

Each node receives multiple power levels at step 708. This could include each node receiving multiple messages identifying the power level to be used by that node. In particular, if a node resides within n clustering plans, the node receives n power levels, one from a cluster controller in each clustering plan. Each node begins using the received power levels at step 710. In some embodiments, all of the nodes can implement their new power levels at substantially the same time. For instance, assuming the messaging in the system has a worst-case delay of x TTIs, all nodes could implement the new power levels at the $(x+1)^{th}$ TTI. Also, for each message received from one of its cluster controllers, each node can perform its own local proportional fair (PF) scheduling or any other utility (such as max-min optimization) based on knowledge of the power levels of its neighbors for those resources controlled by that cluster controller.

One or more characteristics of the system are monitored by the nodes at step 712 and reported to the cluster controllers at step 714. This could include, for example, each node in the clustering plans reporting information such as mutual interference to the cluster controllers. This information can be used during a later iteration of the method 700 to update the downlink power control settings.

The method 700 could be performed at any suitable interval. For example, for downlink power control, scheduling and modulation and coding scheme (MCS) adaptation can be done using the knowledge of all nodes associated with the clusters and assuming local PF scheduling (or any other scheduling). In this case, decisions could be made at every TTI and implemented dynamically at every TTI delayed by x TTIs from the decisions. As another example, decisions could be made every y TTIs to reduce the overhead (and in between, the same power levels can be maintained). As a third example, power levels could be evaluated in advance for ZTTIs by performing off-line evaluations, informing the nodes and other cluster controllers, and implementing the solution in a semi-static cyclic manner.

Although FIGS. 4 through 7 illustrate examples of sequential and parallel optimization operations in different clustering plans, various changes may be made to FIGS. 4 through 7. For example, while the optimization of downlink power control is described above, the same or similar techniques could be used to optimize any other operating parameter(s) of the nodes in the clusters.

While some of the optimizations described above are implemented for different clustering plans using different resource blocks of frequencies, other types of multiplexing could be used for the clustering plans, such as by implementing optimizations for different clustering plans using different times or different carriers. For instance, all clustering plans could use all resource blocks (or all frequency bands) for optimization at one time slot. In the next time slot, clustering plan CP2 could perform optimization again over all frequency bands. In the next time slot, clustering plan CP3 could perform optimization yet again over all frequency bands. The percentages of time that the clustering plans perform optimization could be assigned according to their relative loadings as explained above.

When operating under different carriers, the cluster controllers in the different clustering plans could optimize the resources of their own carriers without optimizing the resources of other carriers. Carrier bandwidths and the sizes of the clusters in each clustering plan can be assigned under similar constraints as the allocation of other resources as explained above.

Other than time and frequency, other resource assignments could include code assignments, such as in code division multiple access (CDMA) systems, or any other or additional network resources. Therefore, the term "resource" used in this patent document encompasses any suitable type(s) of network resource(s), including frequency bands, carriers, time frequency blocks, broadcast channels, encrypting codes, pseudo-random codes, memory storage, antennas, data channels, or control channels used in radio air interfaces.

Figure 8:
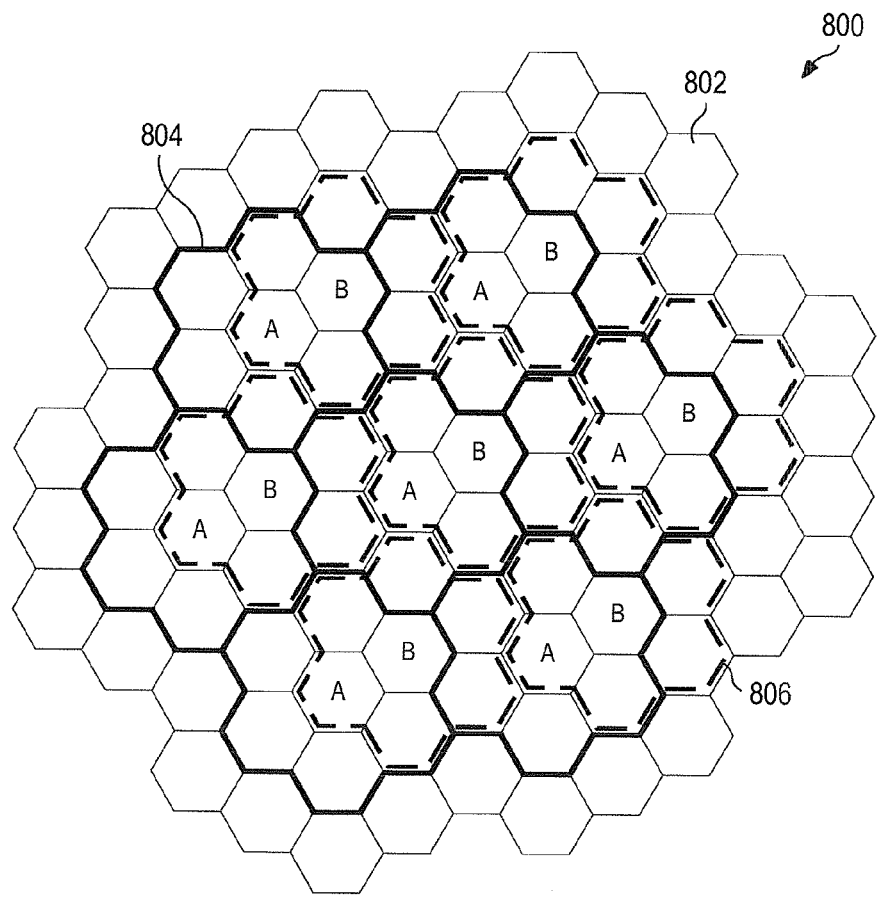
FIG. 8 illustrates another example clustering of nodes in a communication system using multiple overlapping clustering plans according to this disclosure.

FIG. 8 illustrates another example clustering of nodes in a communication system 800 using multiple overlapping clustering plans according to this disclosure. As shown in FIG. 8, the clustering is performed using cells 802 of a wireless network or other network. The cells 802 represent different geographic regions where service is provided to end user devices. The cells 802 therefore provide a convenient way to verify that nodes in one cell are geographically centered in a cluster of at least one clustering plan.

In this example, there are two clustering plans shown. Clustering plan "A" includes clusters 804 defined by solid lines, and clustering plan "B" includes clusters 806 defined by dashed lines. Each cluster 804-806 includes seven cells 802, namely a central cell and six surrounding cells. Note that each cluster could include a central cell and any other number of peripheral cells around the central cell. Also note that additional clustering plans can also be created here. In all, a total of seven clustering plans could be used, which can ensure that each cell 802 is centered in the cluster of one clustering plan. Note that the clusters and cells need not be symmetrical as shown here.

Resources can be allocated in the clusters in any suitable manner. For example, the resources can be allocated to reflect the loading of the end user devices exclusively controlled by a given clustering plan. "Exclusively controlled" end user devices include devices not located in the boundary of a cluster. In FIG. 8, this would include end user devices located in the central cell 802 of a cluster in a clustering plan (so it should have little if any interference with neighboring clusters in the same clustering plan). In the example shown in FIG. 8, around ⅐th of the resources in a cell 802 may be exclusively controlled by each of seven clustering plans, assuming equal loading in each cell.

Although FIG. 8 illustrates another example of the clustering of nodes in a communication system 800 using multiple overlapping clustering plans, various changes may be made to FIG. 8. For example, the communication system 800 could include any number of cells 802 in any suitable configuration and any number of clusters and clustering plans.

Figure 9:
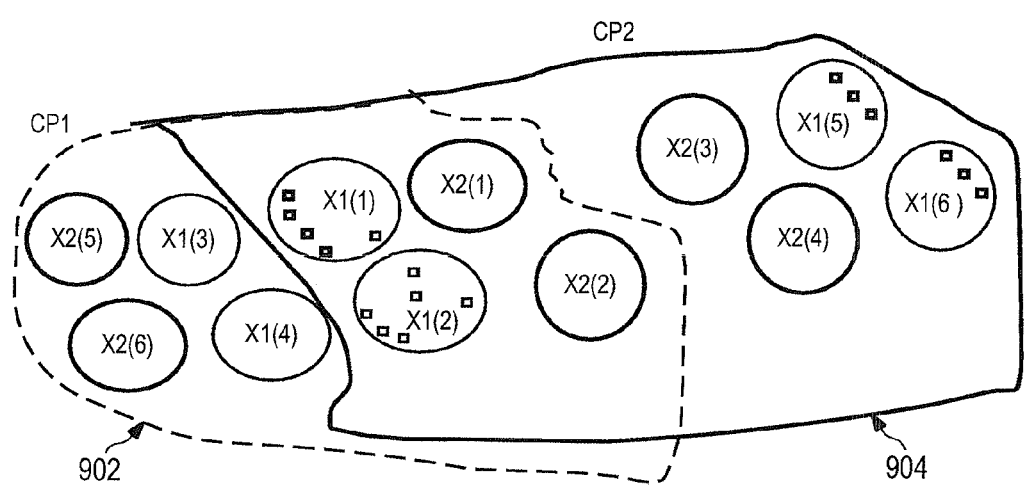
FIG. 9 illustrates an example assignment of resources for nodes in different clustering plans according to this disclosure.

FIG. 9 illustrates an example assignment of resources for nodes in different clustering plans according to this disclosure. In this example, there are two clusters 902-904 associated with different clustering plans. Here, nodes X1(1)-X1(4) are central (non-boundary) nodes in the cluster 902 of clustering plan CP1 (shown in this example with a dashed-line border), but they are boundary nodes in the cluster 904 of clustering plan CP2 (shown in this example with a solid-line border). Nodes X1(5)-X1(6) are also boundary nodes in the cluster 904 of clustering plan CP2. Similarly, nodes X2(1)-X2(4) are central (non-boundary) nodes in the cluster 904 of clustering plan CP2, but they are boundary nodes in the cluster 902 of clustering plan CP1. Nodes X2(5)-X2(6) are also boundary nodes in the cluster 902 of clustering plan CP1.

In the following discussion, Pct_X2($i$) denotes the percent loading of boundary users in the $i^{th}$ node of clustering plan CP2, where i is a boundary node in CP2. Since the boundary nodes X1(1)-X1(4) of the clustering plan CP2 are exclusively served by the clustering plan CP1, the percentage of resources allocated to the clustering plan CP1 can be larger than the maximum of Pct_X2(1), Pct_X2(2), Pct_X2(3), Pct_X2(4), Pct_X2(5), and Pct_X2(6). This include the nodes X1(5)-X1(6) along the other boundaries of the clustering plan CP2 and, if there are boundary nodes to the right of clustering plan CP2 (not shown in FIG. 9), they are also included in this list. In this way, the clustering plan CP1 can have adequate resources to serve the boundary nodes from clustering plan CP2, which would make the global optimization more accurate.

Although FIG. 9 illustrates one example of an assignment of resources for nodes in different clustering plans, various changes may be made to FIG. 9. For example, other techniques could be used for assigning resources to clustering plans. As a particular example, in another optimization approach, when an optimization is done by one cluster controller of one clustering plan, some of its boundary nodes may not be taken into consideration for that optimization. This may occur, for instance, if those boundary nodes are part of another clustering plan and the other clustering plan can serve those boundary nodes using its assigned resources. In still other embodiments, resources common to all clustering plans could be used to serve certain non-boundary nodes. In all of these cases, the MCS level at a given node could be decided locally by that node based on the knowledge of the power levels (received from other cluster controllers) and other associated parameters (decided by the optimization algorithm of the cluster controllers) of the neighboring nodes within and outside its own cluster. This helps to make the local MCS adaptation more accurate, as the actual signal to noise plus interference ratio (SNIR) could be evaluated very accurately when the transmit power and other associated parameters (such as precoding) of the neighbor nodes are known.

The techniques shown in FIGS. 1 through 9 and described above have involved the use of multiple clustering plans, where clusters in the same clustering plan do not overlap while clusters in different clustering plans do overlap. An additional related technique for solving the cluster boundary problem is shown in FIGS. 10 through 12B. In this technique, clusters within a communication system have adjustable boundaries, and the boundaries of a cluster can expand and contract in order to solve the cluster boundary problem. This technique may be referred to as cluster "breathing" since the boundaries of a cluster can oscillate back and forth. This additional technique is related to those described above since the clusters can be expanded and contracted to convert a boundary node under a cluster's first set of boundaries into a non-boundary node under the cluster's second set of boundaries. Also, network resources can be partitioned and controlled similar to what is described above in order to serve nodes located in multiple clusters.

Figure 10:
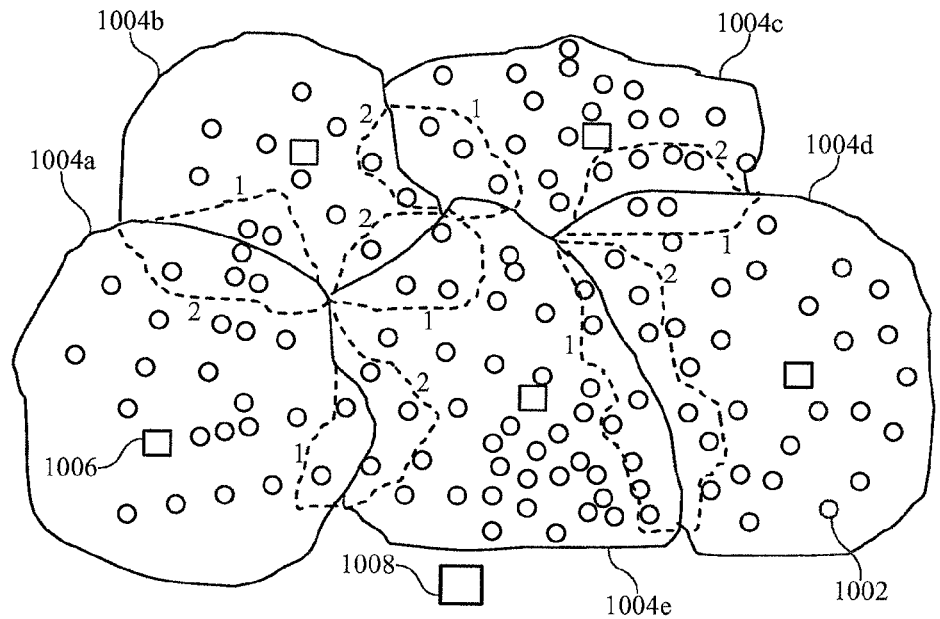
FIG. 10 illustrates an example communication system supporting clustering optimization using clusters with adjustable boundaries according to this disclosure.

FIG. 10 illustrates an example communication system 1000 supporting clustering optimization using clusters with adjustable boundaries according to this disclosure. As shown in FIG. 10, the communication system 1000 includes a number of nodes 1002. The nodes 1002 can be partitioned into multiple clusters 1004a-1004e. Each cluster 1004a-1004e can have an associated cluster controller 1006, and at least one central controller 1008 can be present in the system 1000. The nodes 1002 can be the same as or similar to the nodes 102 described above. The cluster controllers 1006 and the central controller 1008 could be similar to the cluster controllers 106 and the central controller 108 described above, although the cluster controllers 1006 and the central controller 1008 support a different clustering scheme.

In the system 1000 of FIG. 10, the clusters 1004a-1004e have adjustable boundaries. For example, the clusters 1004a-1004e could originally be defined as having non-overlapping boundaries, shown in this example with solid-line borders (these borders may be referred to as "normal" boundaries). However, the boundaries of the clusters 1004a-1004e can expand or contract with respect to their original positions. Examples of these new boundaries are shown in FIG. 10 with dashed-line borders. Note that the cluster controllers 1006 could remain fixed within the clusters 1004a-1004e, meaning a different cluster controller need not be selected each time a cluster expands or contracts. In this document, a cluster "instance" refers to a cluster with a particular set of boundaries. Therefore, multiple cluster instances can be defined by the different boundaries of the same cluster.

It is possible that a node 1002 could reside within multiple clusters as the clusters' boundaries expand and contract. For these nodes, network resources could be partitioned and controlled by different clusters. That is, the optimization solutions for multiple clusters could be applied to different portions of network resources for the nodes 1002 residing in the multiple clusters. This could be done in a manner similar to that described above with respect to FIGS. 1 through 9.

The boundaries of the clusters 1004a-1004e can be defined and varied in any suitable manner. For example, in some embodiments, a cluster's boundaries can be expanded to bring at least one node 1002 into the cluster or contracted to remove at least one node 1002 from the cluster. This can be done using any suitable static or dynamic technique. For instance, the boundaries of a cluster 1004a-1004e can be varied so that a boundary node 1002 under the cluster's first set of boundaries becomes a non-boundary node under the cluster's second set of boundaries. A boundary node can be identified in any suitable manner, such as any node 1002 receiving interference from at least one other cluster or causing interference in at least one other cluster. The excess of interference can be identified, for instance, using threshold interference levels and the number of users in the node that experiences interference. The expansion and contraction of the cluster boundaries could also be based on the network resources assigned to the clusters. For instance, for each cluster boundary modification, the resources that would be controlled or optimized by a cluster could be different and non-overlapping. As another example, cluster boundary modifications may repeat in a cyclical manner so that each cluster controller 1006 controls approximately the same amount of resources in each cluster instance.

Various techniques could be used to control the relative expansion and contraction of each cluster 1004a-1004e in the system 1000. For example, in some embodiments, when a cluster expands in one direction, that cluster could contract in another direction, thereby keeping roughly the same size or loading in the cluster. An example of this is shown in FIG. 10, where the dashed-line boundaries in FIG. 10 are labeled either "1" or "2" to denote boundaries that are used together. When cluster 1004a uses its "1" boundaries, the cluster 1004a generally expands on top and contracts on the right. When cluster 1004a uses its "2" boundaries, the cluster 1004a generally contracts on top and expands on the right. All of the clusters in FIG. 10 have at least one boundary that can change between "1" and "2" positions (as well as its normal position). In other embodiments, a first subset of clusters could expand while a second subset of clusters could contract during a given boundary change, and then the first subset of clusters could contract while the second subset of clusters could expand during a subsequent boundary change.

In the cluster breathing approach, a node 1002 along a cluster boundary in one cluster instance is located more centrally in another cluster instance. When a node 1002 belongs to different clusters as a result of the changing boundaries, different portions of the bandwidth or other network resources associated with that node 1002 can be controlled by those different clusters, or the same network resources associated with that node 1002 can be controlled by those different clusters at different times. Depending on the implementation, this could provide close to globally-optimized performance in the system 1000.

Although FIG. 10 illustrates one example of a communication system 1000 supporting clustering optimization using clusters with adjustable boundaries, various changes may be made to FIG. 10. For example, a communication system 1000 could include any number of nodes 1002 in any suitable configuration. Also, the communication system 1000 could include any number of clusters having any number of adjustable boundaries to provide adequate coverage of the nodes 1002.

Figure 11:
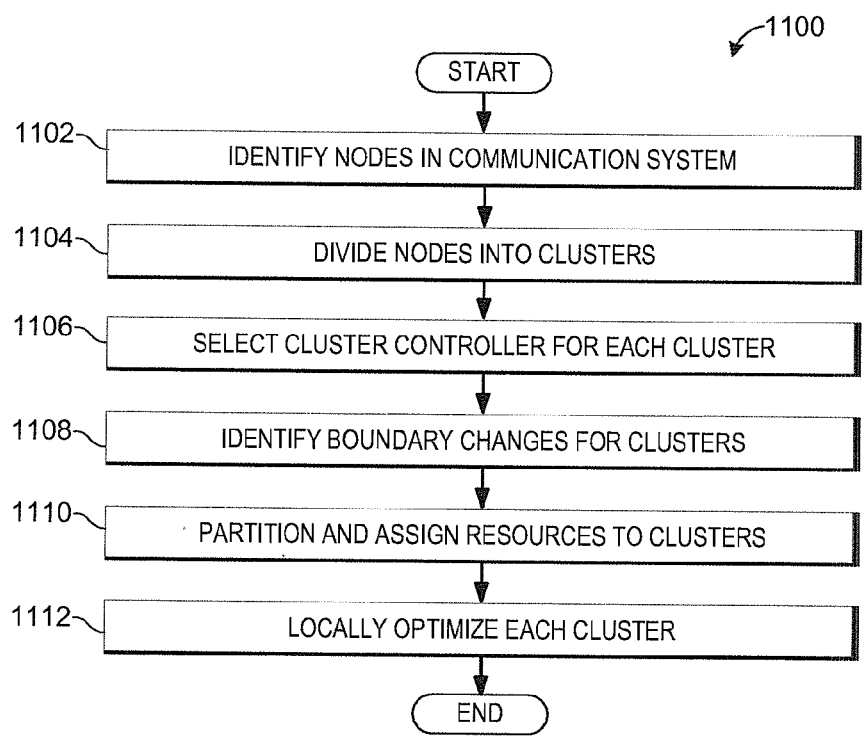
FIG. 11 illustrates an example method for clustering nodes in a communication system using clusters with adjustable boundaries according to this disclosure.

FIG. 11 illustrates an example method 1100 for clustering nodes in a communication system using clusters with adjustable boundaries according to this disclosure. As shown in FIG. 11, nodes in a communication system are identified at step 1102. This could include, for example, a central controller 1008 identifying the nodes 1002 in the system 1000. As a particular example, this could include the central controller 1008 identifying different base stations or other devices that are present within a wireless system.

The nodes are divided into clusters at step 1104. This could include, for example, the central controller 1008 performing any suitable segmentation algorithm to divide the nodes 1002 into clusters. The clusters here may represent non-overlapping clusters. As a particular example, the nodes 1002 can be segmented into clusters in such a way that a locally-optimal solution could be obtained in each of the clusters. A cluster controller for each cluster is selected at step 1106. This could include, for example, the central controller 1008 selecting a base station or other node 1002 located in a central area of each cluster to act as the cluster controller for that cluster. Each cluster controller can be selected to perform optimization operations for the nodes in that cluster. Any of the techniques described above with respect to FIG. 3 could be used to segment the nodes into clusters.

Boundary changes for the clusters are identified at step 1108. As noted above, various techniques could be used to statically or dynamically identify changes to the boundaries between clusters. This could include, for example, the central controller 1008 or the cluster controllers 1006 identifying boundary nodes 1002 in the system 1000, where the boundary nodes 1002 are experiencing interference from another cluster or causing interference in another cluster. Adjustments to the cluster boundaries could then be determined based on the identified boundary nodes 1002, such as by identifying cluster boundary adjustments that cause a boundary node to become a non-boundary node.

Network resources are partitioned and assigned to the different clusters at step 1110, and local optimization occurs in each cluster at step 1112. This could include, for example, the central or cluster controllers assigning resources to the clusters based on the loadings of the clusters. Different resources could be assigned to a cluster at different times, such as depending on which cluster boundaries are being used by that cluster at a particular time. Effectively, each cluster instance can be assigned suitable network resources.

As a particular example, downlink power control can be optimized as follows. In one approach, different percentages of network resources are optimized by each cluster instance depending on whether the normal cluster boundaries, the modified "1" cluster boundaries, or the modified "2" cluster boundaries are used. For example, when the normal cluster boundaries are used, the cluster controllers 1006 could optimize X % of the network resources. When the modified "1" cluster boundaries are used, the cluster controllers 1006 could optimize Y % of the network resources. When the modified "2" cluster boundaries are used, the cluster controllers 1006 could optimize Z % of the network resources. The values of X, Y, and Z can be global parameters, and they can be proportional to the loading in each cluster. As a result, cluster expansion or contraction can occur in a roughly proportional manner for each cluster. Note that the values of X, Y, and Z can be known to all clusters, supporting network-wide allocation. This approach generally supports orthogonal resource sharing.

In another approach, downlink power control can be optimized as follows. In one time slot, optimization can occur using the normal cluster boundaries. During another time slot, optimization can occur using the modified "1" cluster boundaries. During yet another time slot, optimization can occur using the modified "2" cluster boundaries. This approach generally supports time division clustering.

Although FIG. 11 illustrates one example of a method 1100 for clustering nodes in a communication system using clusters with adjustable boundaries, various changes may be made to FIG. 11. For example, while shown as a series of steps, various steps in FIG. 11 could overlap, occur in parallel, or occur multiple times. Also, note that each step in FIG. 11 could be performed by any suitable device(s) and is not limited to those devices described above.

Figure 12A:
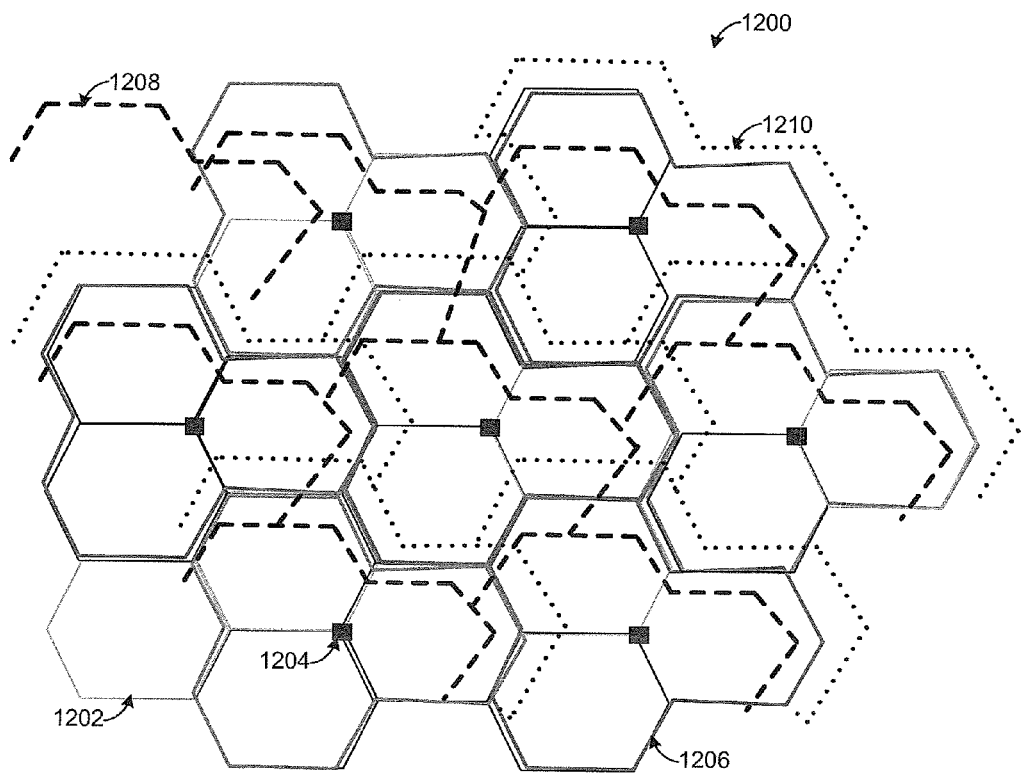
FIGS. 12A and 12B illustrate another example clustering of nodes in a communication system using clusters with adjustable boundaries according to this disclosure.
Figure 12B:
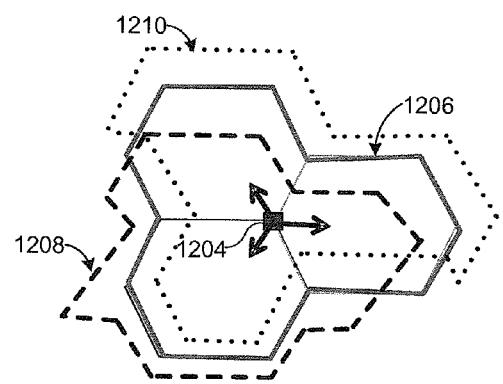

FIGS. 12A and 12B illustrate another example clustering of nodes in a communication system 1200 using clusters with adjustable boundaries according to this disclosure. As shown in FIG. 12A, the clustering is performed using cells 1202 of a wireless network or other network. In this example, the cells 1202 are grouped into dusters, where each cluster has three cells 1202. Each cluster includes a cluster controller 1204, which is located near the center of the cluster where the three cells 1202 meet. Note that each cluster could include any other number of cells, and a cluster controller 1204 could have any other suitable location.

There are three different cluster boundaries for each cluster shown in FIG. 12A. The cluster boundaries for a single cluster are shown in FIG. 12B for ease of understanding. Normal cluster boundaries are denoted with solid lines 1206. First modified cluster boundaries are denoted with dashed lines 1208. Second modified cluster boundaries are denoted with dotted lines 1210. Note that any number of additional cluster boundaries could also be defined here.

The different boundaries shown in FIGS. 12A and 12B could be defined or modified in any suitable manner. For example, the boundaries could be defined or modified based on the locations of any boundary nodes, which can affect how far a cluster boundary is expanded in order to encompass the boundary nodes. Interference between nodes could also be used to identify boundary nodes and to identify which nodes are placed within multiple clusters, such as by using "Aij/Cij" metrics.

As can be seen more clearly in FIG. 12B, the boundaries denoted with dashed lines 1208 expand a cluster in roughly half of its directions and contracts the cluster in roughly the other half of its directions. The boundaries denoted with dotted lines 1210 expand the cluster in the reverse directions. These boundary changes generally expand the cluster into a specified number of its neighboring clusters. In FIG. 12A, each cluster expands into three of its six neighbors with each of two different boundary changes. Note that other expansions could be used, such as by expanding a cluster into two of its six neighbors with each of three different boundary changes.

As noted above, the expansion of a cluster into its neighbors could be determined based on mutual interference among the nodes of the clusters. The expansion could also be based on the actual locations of various nodes in the clusters. The expansion and contraction can be done in such a way that the number of cluster boundaries on each side of a cluster is approximately equal, although this is not required. For instance, in one approach, assume that r % of nodes (r<50) are to be acquired by a specified cluster, and assume that r % of nodes are to be surrendered from the specified cluster to its neighboring clusters in a boundary change. Larger values of r may provide better overall optimization performance. Starting at the specified cluster, its boundaries can be expanded to one side to acquire roughly (r/n) % of the nodes from each neighboring cluster on that side (where n is the number of neighboring clusters on that side). Also, (r/m) % of nodes are surrendered from the specified cluster to each of the neighboring clusters on the other side (where m is the number of neighboring clusters on the other side). This process can then be repeated for each of the neighboring clusters while honoring the previously-moved boundaries. In another approach, the maximum percentage of boundary nodes that could become non-boundary nodes in a boundary change can be identified. The boundaries are then modified to cover those nodes while ensuring that enough network resources (equal to or larger than that percentage) are assigned to the cluster.

Although FIGS. 12A and 12B illustrate another example of the clustering of nodes in a communication system 1200 using clusters with adjustable boundaries, various changes may be made to FIGS. 12A and 12B. For example, the communication system 1200 could include any number of cells 1202 in any suitable configuration and any number of clusters and boundary changes.

Note that while certain optimization operations are shown in the figures and described above (such as downlink power control), any suitable optimization(s) can be performed by the cluster controllers in FIGS. 1 through 12B. Example optimizations include joint power control and scheduling, joint power control and scheduling with coordinated multipoint processing (CoMP) or beam forming, cell association, and load balancing.

Also note that the use of multiple clustering plans and the use of "breathing" clusters in a clustering plan can find use in a wide variety of systems. Example systems include 4G and Beyond 4G commercial cellular systems, such as LTE, advanced LTE, or other systems. Another example type of system is a heterogeneous network or "HetNet," where numerous tightly-coupled clustered cells often exist naturally. In addition, the techniques described above can be used in central controllers, cluster controllers, base stations or other infrastructure devices, and cellular handsets or other end user equipment. For instance, cellular handsets could include a mechanism for measuring a wireless channel and using that information to optimize its own power control algorithm. As such, the techniques and methods described above are not limited to use in just base stations.

In addition, note that techniques or functions described with respect to one or more figures above could be used in other figures above. For example, techniques or functions described with respect to FIGS. 8 and 9 could be used in the system 100 or 200 of FIG. 1 or 2. Similarly, techniques or functions described with respect to FIGS. 12A and 12B could be used in the system 1000 of FIG. 10.

Figure 13:
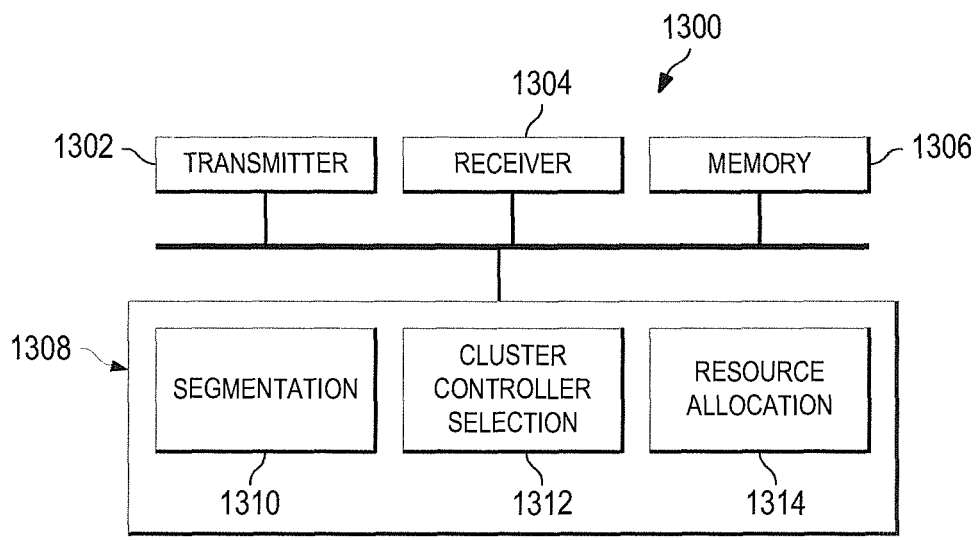
FIGS. 13 and 14 illustrate example devices supporting clustering optimization according to this disclosure.
Figure 14:
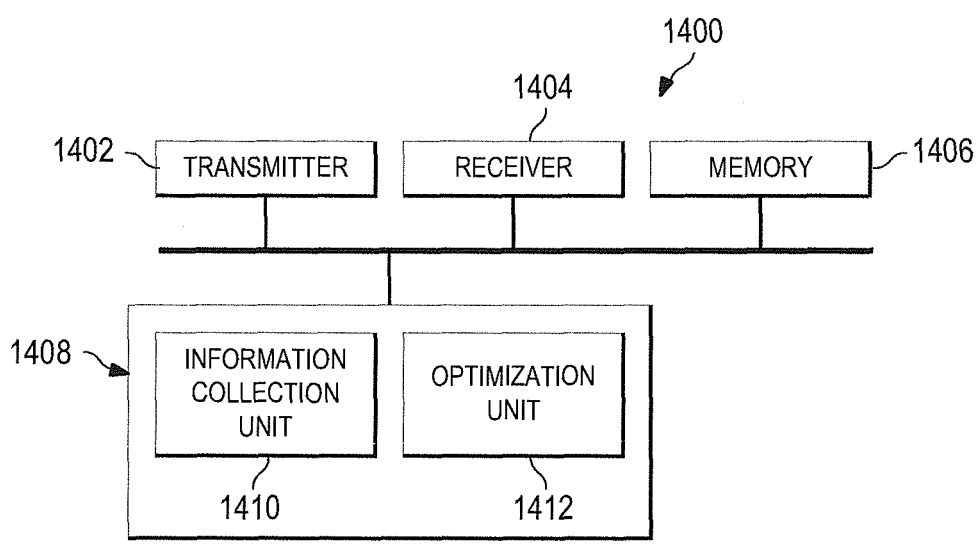

FIGS. 13 and 14 illustrate example devices supporting clustering optimization according to this disclosure. In FIG. 13, a device 1300 can be used as a central controller 108, 1008 or other device for controlling the division of a communication system into clusters.

As shown in FIG. 13, the device 1300 includes at least one transmitter 1302 and at least one receiver 1304. Each transmitter 1302 is configured to send data (such as cluster assignments, resource assignments, optimization invocations, and the like) to other components in a communication system. The receiver 1304 is configured to receive data (such as end user device identifications, optimization solutions, and the like) from other components in the communication system. The transmitter 1302 includes any suitable structure for transmitting data, and the receiver 1304 includes any suitable structure for receiving data. The transmitter 1302 and receiver 1304 could represent wired or wireless interfaces. Note that a transmitter and a receiver can collectively reside within a common transceiver. Also note that a combination of multiple transmitters and receivers (including wired and wireless interfaces) could be used. In general, "communication circuitry" refers to wired or wireless transmission and/or reception circuitry, either collectively or individually.

At least one memory 1306 stores instructions and data used, generated, or collected by the device 1300. For example, the memory 1306 could store information identifying different nodes in a communication system and information used to segment the nodes into different clusters, different cluster instances, or different clustering plans. The memory 1306 could also store information associated with operations of the nodes within the clusters. The memory 1306 could store any other or additional information. The memory 1306 includes any suitable volatile and/or nonvolatile storage and retrieval device(s).

At least one processing unit 1308 implements the processing operations of the device 1300. In this example, the processing unit 1308 includes various functional units 1310-1314 that implement the processing operations associated with the clustering of nodes in a communication system. For instance, a segmentation unit 1310 could implement a segmentation algorithm to divide the nodes of a communication system into clusters. A cluster controller selection unit 1312 could select the cluster controller for each cluster. In addition, a resource allocation unit 1314 could partition and assign network resources to the different clusters.

Each processing unit 1308 includes any suitable processing or computing device configured to perform one or more operations. Each processing unit 1308 could, for example, include a microprocessor, microcontroller, digital signal processor, field programmable gate array, or application specific integrated circuit. Also, each of the functional units 1310-1314 could be implemented in any suitable manner. In some embodiments, the functional units 1310-1314 represent software/firmware instructions stored in the memory 1306 and executed by the processing unit 1308. In other embodiments, the functional units 1310-1314 represent hardware modules.

In FIG. 14, a device 1400 can be used as a cluster controller 106 or 1006, base station, end user device, or other node for computing or implementing optimizations. As shown in FIG. 14, the device 1400 includes at least one transmitter 1402, at least one receiver 1404, at least one memory 1406, and at least one processing unit 1408. These components could be the same as or similar to the corresponding components in FIG. 13 (although memory capacity, processor speeds, or other device characteristics can differ depending on the type of device).

In this example, the processing unit 1408 includes various functional units 1410-1412 that implement the processing operations associated with the device 1400. For instance, an information collection unit 1410 could gather information associated with operation of one or more nodes. As a particular example, the information collection unit 1410 in a cluster controller 106 or 1006 can collect information about the nodes in its cluster, while the information collection unit 1410 in a base station or end user device could collect information about its wireless channels (such as interference). An optimization unit 1412 could perform optimization operations for a node or one or more clusters of nodes. For instance, the optimization unit 1412 in a cluster controller 106 or 1006 could generate an optimization solution for all of the nodes within its cluster, and the optimization unit 1412 in a base station or end user device could generate optimal operating parameters for that device. Each of the functional units 1410-1412 could be implemented in any suitable manner, such as using software/firmware instructions or hardware modules.

Although FIGS. 13 and 14 illustrate examples of devices 1300 and 1400 supporting clustering optimization, various changes may be made to FIGS. 13 and 14. For example, the devices 1300 and 1400 shown in FIGS. 13 and 14 could be used to implement any of the techniques described above, such as to partition a network into multiple clustering plans or breathing clusters, allocate resources amongst the clusters, and perform optimizations for the clusters. However, these operations could be performed by any other suitable device or system.

Figure 15:
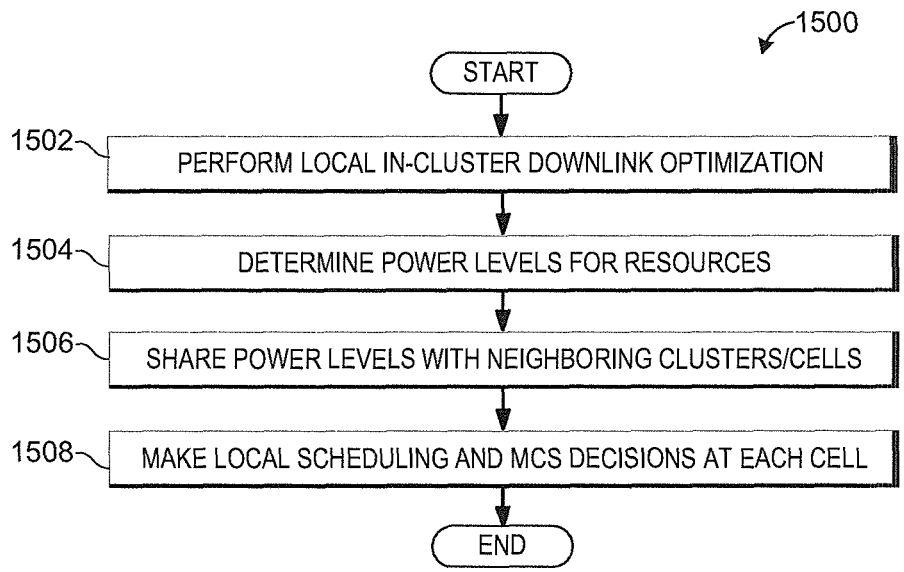
FIGS. 15 through 17 illustrate example methods for local optimization within a cluster according to this disclosure.
Figure 16:
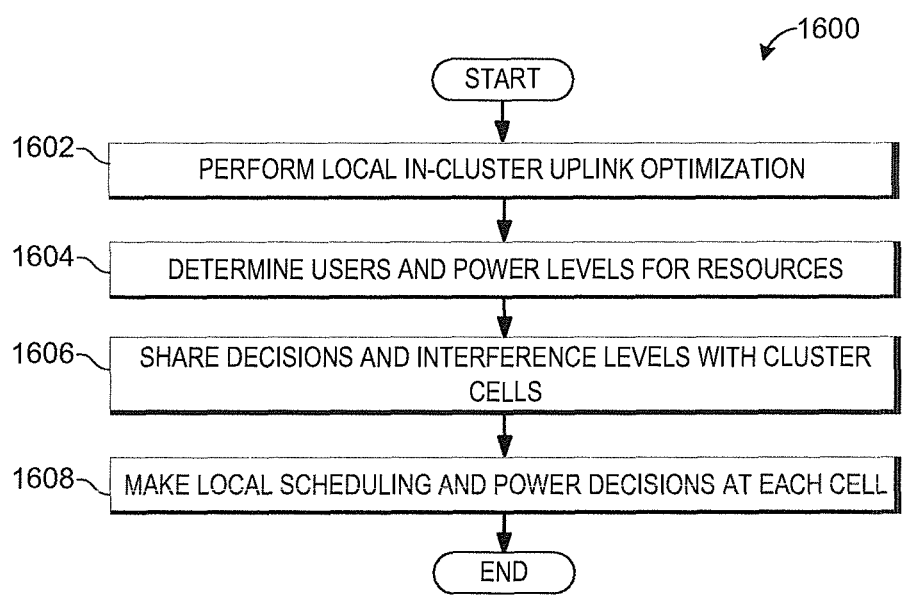
Figure 17:
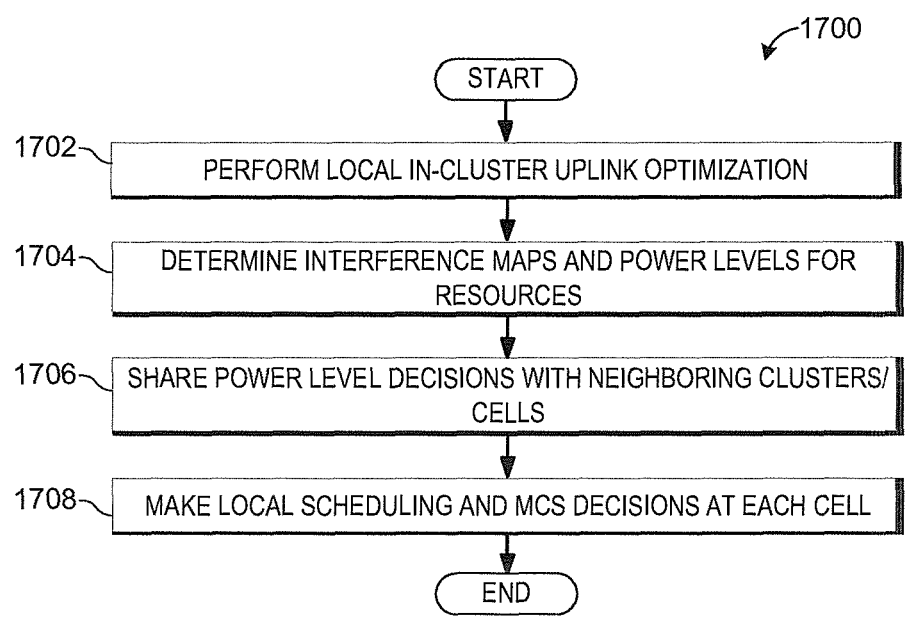

FIGS. 15 through 17 illustrate example methods for local optimization within a cluster according to this disclosure. As noted above, nodes in a communication system can reside within multiple clusters. This could occur as shown in FIGS. 1 through 9, where a node resides within different clusters in different clustering plans. This could also occur as shown in FIGS. 10 through 12B, where a node can reside within different clusters as those clusters' boundaries change. The methods shown in FIGS. 15 through 17 illustrate example techniques for individual clusters to perform cluster optimizations for their resources and to implement the optimization results for scheduling, MCS decisions, and transmit power decisions after the system has been segmented into the clusters.

In the following discussion, it is assumed that each cluster includes multiple cells, such as is shown in FIG. 8 or FIG. 12A. A boundary cell of a cluster is a cell in that cluster causing interference in a cell of an adjacent cluster or receiving interference from a cell in an adjacent cluster. A boundary user is a user in a boundary cell causing interference to or receiving interference from a cell in an adjacent cluster.

As shown in FIG. 15, a method 1500 is used for downlink in-cluster optimization for a given clustering plan and associated resource set. Local in-cluster downlink optimization is performed at step 1502. As part of this optimization, downlink power levels for the resources assigned to that cluster are determined at step 1504. This could include, for example, the cluster controller for a cluster performing optimization calculations to determine the downlink power levels. The power levels are shared at step 1506. This could include, for example, the cluster controller broadcasting its determined power levels to any neighboring clusters or cells. Local scheduling and MCS decisions are made in each cell of the cluster at step 1508. These decisions are made in each cell with knowledge of the power levels used in the neighboring cells (both within the same cluster and in adjacent clusters).

When a cluster is carrying out downlink optimization as shown in steps 1502-1504, interference from cells in neighboring clusters may be handled in various ways. In a first approach, interference from cells in adjacent clusters is simply ignored during downlink optimization. In a second approach, each cluster controller assumes that full transmission power is used for resources in adjacent clusters' cells. In a third approach, each cluster controller uses a basic power level that is lower than the normal power level for boundary cells in adjacent clusters. The third approach can be used, for instance, when some cells have higher percentages of users getting interference from other cells. The third approach can therefore be based on the percentage of users getting interference from a given cell in adjacent cells (a threshold percentage can be found using, for example, simulations), and both clusters are aware of the power constraints and adhere to them so that they do not exceed those power levels during downlink optimization. Note that in all three approaches, after optimization when the exact powers of the adjacent clusters' cells are known (by sharing information amongst clusters and cells), those values are used to make local scheduling and MCS adaptation decisions in each cell.

As shown in FIG. 16, a method 1600 is used for uplink in-cluster optimization for a given clustering plan and associated resource set. Local in-cluster uplink optimization is performed at step 1602. As part of this optimization, users and uplink power levels for the resources assigned to that cluster are determined at step 1604. This could include, for example, the cluster controller for a cluster performing optimization calculations to determine the uplink power levels. During the optimization calculations, no users or a limited number of users from edge cells could be included in the optimization. The optimization decisions and interference levels with neighboring cells are shared with the cells in the cluster at step 1606. This could include, for example, the cluster controller broadcasting its determined users, power levels, and interference levels. Local scheduling and power decisions are made in each cell of the cluster at step 1608. These decisions are made in line with the decisions of the cluster controller, although it is possible for MCS or power adjustments to be made.

In this approach, the cluster controller's decisions are applied for scheduling users and uplink powers. When adhering to the cluster controller's decisions, this could cause interference to cells in neighboring clusters. Ideally, in-cluster optimization is therefore performed by including only the users not causing interference (above a certain threshold) to cells in adjacent clusters. If there is not enough of a proportion of users in the cluster's cells who meet this criteria to match the proportion of resources allocated to a cluster plan (x %), the percentage of resources for that cluster plan can be increased (if there is no conflict with other cluster plans), or x % of users who cause minimum interference to cells in other clusters can be selected (by changing the interference threshold). Since adjacent clusters may interfere with this cluster, users in edge cells close to the cluster boundary may need to lower their MCS level and power by a margin to allow for unexpected interference variations.

As shown in FIG. 17, another method 1700 is used for uplink in-cluster optimization for a given clustering plan and associated resource set. Local in-cluster uplink optimization is performed at step 1702. As part of this optimization, interference maps and uplink power levels for the resources assigned to that cluster are determined at step 1704. This could include, for example, the cluster controller for a cluster identifying mutual interference and/or total interference between cells of different clusters. The power levels are shared at step 1706. This could include, for example, the cluster controller broadcasting its determined power levels to any neighboring clusters or cells. Local scheduling and MCS decisions are made in each cell of the cluster at step 1708. These decisions are made using the interference maps, which allow each cell to know the interference levels in adjacent cells of the same cluster.

In this approach, each cell performs local scheduling according to the interference maps. After performing cluster optimization, the cluster controller provides the interference maps (which identify interference caused by one cell to other cells or similar resulting interference information) to the individual cells in its cluster. Each cell can select the best user locally, as it knows the interference each cell causes to other cells. Another way to do local scheduling is to use total interference (such as Interference over Thermal Noise or "IoT") a cell has experienced, instead of the mutual interference levels. In that case, when choosing a user and an associated power level, the cell choosing a user may keep an interference margin from a target total interference of the neighboring station.

Note that this approach may not resolve the issue of users in boundary cells causing unexpected interference to adjacent clusters. There are several techniques for addressing this issue. In a first technique, during the optimization, only the users not causing excessive interference to cells outside the cluster could be selected. If the percentage of such users is less than the percentage of resources (x %) in a clustering plan, the percentage of resources for the clustering plan could be increased without violating the requirements of other cluster plans. If that cannot be done, x % of users in the cell edge who cause minimum interference to cells in other clusters can be selected. The percentage of users causing interference to other clusters can be identified to the other clusters before optimization so that the other clusters can use that information in their optimizations (having an extra outside cluster interference element for boundary cells in their optimizations). For example, if the percentage of such users is large, boundary cells in the other clusters could assume that the interference is large for those resource blocks by some y margin.

In another technique, interference from cells in adjacent clusters is ignored when performing the optimization. After that, when doing local scheduling (since the interference levels in the cells of the adjacent clusters are also known), the users in the boundary cells could consider the interference targets in the cells in the adjacent clusters when deciding their power and MCS levels (without exceeding the interference of the neighbors and keeping a margin).

In a third technique, assume a z decibel higher interference margin for a boundary cell in an adjacent cluster than the average interference of other resources in that boundary cell. Average interference could be the interference observed by other resources of that boundary cell in the past (the other resources can be controlled by a different clustering plan that has this boundary cell as a center cell). This could also be used when performing the in-cluster optimization as a constraint to be more accurate.

Although FIGS. 15 through 17 illustrate examples of methods for local optimization within a cluster, various changes may be made to FIGS. 15 through 17. For example, other techniques could be used to perform uplink or downlink optimization in a cluster. Also, while shown as a series of steps, various steps in each figure could overlap, occur in parallel, or occur multiple times. Further, note that each method could be performed by any suitable device(s) and is not limited to those devices described above.

Note that in the description above, it is assumed that each node in a network appears as a boundary node in at least one cluster and as a non-boundary node in at least one other cluster. However, there could be some instances where one or more nodes appear only as a boundary node or only as a non-boundary node. For example, an outlier node at the far edge of a network might only appear as a boundary node, which might be done to reduce the number of clustering plans or cluster boundaries required.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of", when used with a list of items, means that different combinations of one or more of the listed items may be used, and only one item in the list may be needed. For example, "at least one of: A, B, and C" may include A, B, C, A and B, A and C, B and C, or A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    segmenting multiple nodes of a communication system into multiple clustering plans, each clustering plan comprising multiple clusters that do not overlap with one another within that clustering plan, at least one of the clusters of one clustering plan overlapping at least one of the clusters of at least one other clustering plan, wherein one of the nodes is a boundary node in at least one cluster of at least one clustering plan and a non-boundary node in at least one other cluster of at least one other clustering plan;
    assigning network resources to individual clustering plans of the multiple clustering plans in accordance with the segmented multiple nodes in the multiple clustering plans, wherein each node of the multiple nodes is assigned resources from at least one of the clustering plans in which the node is a non-boundary node; and
    performing optimization individually for each cluster in each clustering plan.

2. The method of claim 1, wherein a performance of a boundary node in a first cluster is dependent on an operation of one or more nodes in an adjacent cluster.

3. The method of claim 1, wherein assigning the network resources to the individual clustering plans comprises:
    dividing at least some of the network resources among the clustering plans so that each clustering plan has adequate network resources for serving the non-boundary nodes within the clusters of that clustering plan.

4. The method of claim 3, further comprising:
    assigning a portion of the network resources as common network resources to all of the clustering plans.

5. The method of claim 4, wherein the common network resources are used only to serve non-boundary users in the clustering plans during optimization of the clustering plans, each non-boundary user representing a user in a cluster that does not excessively interfere with other clusters and that does not receive excessive interference from other clusters in the same clustering plan.

6. The method of claim 1, wherein segmenting the nodes into the clustering plans comprises segmenting the nodes based on geographical locations of the nodes and each node's wireless coverage area.

7. The method of claim 1, wherein segmenting the nodes into the clustering plans comprises segmenting the nodes based on mutual interference between the nodes.

8. The method of claim 7, wherein nodes are added to a common cluster to increase a total mutual interference among the nodes within that common cluster and to minimize total interference between the common cluster and other clusters.

9. The method of claim 1, wherein a boundary between two clusters in one clustering plan is at or near a center of a cluster in another clustering plan.

10. The method of claim 1, further comprising:
    selecting a cluster controller for each cluster in each clustering plan to perform optimization for that cluster.

11. The method of claim 1, further comprising:
    selecting a cluster controller to perform optimization for adjacent clusters in different clustering plans.

12. The method of claim 1, wherein segmenting the multiple nodes into the multiple clustering plans comprises:

segmenting cells of the communication system into the non-overlapping clusters of each clustering plan, each cluster having a central cell and multiple peripheral cells located around the central cell.

13. The method of claim 12, wherein each peripheral cell in a cluster of one clustering plan is a central cell in a cluster of another clustering plan.

14. The method of claim 1, wherein the network resources comprise at least one of: frequency bands, carriers, time frequency blocks, broadcast channels, data channels, control channels, encrypting codes, pseudo-random codes, memory storage, and antennas.

15. A method comprising:
receiving an indication that a node in a communication system has been selected as a first cluster controller for a first cluster of nodes in the communication system, the first cluster being one of multiple non-overlapping clusters in a first clustering plan, the first clustering plan being one of multiple clustering plans;
performing optimization for network resources in the communication system assigned to the first clustering plan using the first cluster controller; and
performing optimization for network resources in the communication system assigned to a second clustering plan using a second cluster controller associated with a second cluster in the second clustering plan;
wherein the network resources assigned to the first and second clustering plans are assigned in accordance with a segmentation of multiple nodes in the communication system into the first and second clustering plans;
wherein the first cluster of the first clustering plan includes a boundary node that is a non-boundary node in the second cluster in the second clustering plan.

16. The method of claim 15, wherein the cluster controllers perform the optimizations in parallel at the same time.

17. The method of claim 15, wherein the cluster controllers perform the optimizations sequentially at different times.

18. The method of claim 17, wherein one cluster controller calculates its optimization during times when another cluster controller implements its optimization.

19. The method of claim 15, wherein the cluster controllers perform the optimizations a specified amount of time prior to implementation of the optimizations.

20. The method of claim 15, wherein the cluster controllers optimize different portions of the network resources that are assigned to different ones of the multiple clustering plans.

21. The method of claim 15, wherein the cluster controllers optimize common portions of the network resources at different times, the different times assigned to different ones of the multiple clustering plans.

22. The method of claim 15, wherein:
a specified node in the communication system comprises a node in the first clustering plan; and
the specified node determines its users for transmission at a given resource unit belonging to the first clustering plan and determines an associated modulation and coding scheme (MCS) level based on at least one of power levels and precodings identified by adjacent nodes belonging to the same cluster controller or other cluster controllers in the first clustering plan, wherein the users and MCS level are determined using an optimization algorithm for neighboring nodes within and outside a cluster of the specified node.

23. The method of claim 15, wherein:
a specified node in the communication system comprises a node in the first clustering plan; and
the specified node determines its users for transmission at a given resource unit belonging to the first clustering plan and determines an associated modulation and coding scheme (MCS) level, a precoding value, and a power level based on interference levels or rules provided for adjacent nodes belonging to the same cluster controller or other cluster controllers in the first clustering plan, wherein the users, MCS level, precoding value, and power level are determined using an optimization algorithm for neighboring nodes within and outside a cluster of the specified node.

24. The method of claim 15, wherein:
each node is assigned resources from at least one of the clustering plans in which the node is a non-boundary node; and
performing the optimizations comprises performing optimization individually for each cluster in each clustering plan.

25. A method comprising:
receiving multiple messages at a specified node in a communication system, the messages identifying operating parameters to be used by different portions of network resources in the communication system; and
operating the specified node using the operating parameters for the network resources; wherein the messages are received from different cluster controllers associated with different clusters of nodes in the communication system, the different clusters associated with different clustering plans;
wherein the specified node is a boundary node in at least one cluster of at least one clustering plan and a non-boundary node in at least one other cluster of the at least one clustering plan; and
wherein the different portions of the network resources are assigned to the different clustering plans in accordance with a segmentation of multiple nodes in the communication system into the different clustering plans.

26. The method of claim 25, wherein operating the specified node comprises starting use of the operating parameters a specified time after receiving the multiple messages.

27. The method of claim 25, wherein a performance of a boundary node in a first cluster is dependent on an operation of one or more nodes in an adjacent cluster.

28. The method of claim 25, wherein the different portions of the network resources are optimized to address boundary problems associated with the different clusters in which the specified node resides.

29. A method comprising:
segmenting multiple nodes of a communication system into multiple clusters to form first cluster instances of a first clustering plan, the first cluster instances having associated cluster controllers;
modifying boundaries of the clusters to segment the multiple nodes to form second cluster instances of a second clustering plan, wherein a boundary node in at least one cluster instance is a non-boundary node in at least one other cluster instance; and
assigning different portions of network resources to the first and second cluster instances in accordance with the segmented multiple nodes in the first and second clustering plans, the cluster controllers configured to optimize the different portions of the network resources for the first and second cluster instances.

30. The method of claim 29, wherein modifying the boundaries of the clusters comprises:

expanding at least one boundary of each cluster and contracting at least one other boundary of each cluster.

31. The method of claim 29, wherein:

at least some of the nodes reside in multiple cluster instances; and assigning the different portions of the network resources comprises dividing at least some of the network resources among the cluster instances so that each cluster instance has adequate network resources for serving the non-boundary nodes within that cluster instance.

32. The method of claim 1, further comprising allocating network resources to boundary users based on one of the clustering plans in which a serving node of the boundary users is not a boundary node, wherein the boundary users also are served by boundary nodes and are at a boundary of a cluster in another of the clustering plans.

33. The method of claim 1, wherein the network resources comprise power allocations.

34. The method of claim 1, wherein the optimization comprises joint power control optimization and scheduling optimization.

* * * * *